(12) United States Patent  
Cullinane et al.

(10) Patent No.: US 10,855,951 B2  
(45) Date of Patent: Dec. 1, 2020

(54) METHODS AND DEVICES FOR COMPENSATING SAG EFFECT

(71) Applicant: Analog Devices Global Unlimited Company, Hamilton (BM)

(72) Inventors: John Cullinane, Kilmallock (IE); Pablo Ventura, Valencia (ES); Niall D. O'Connell, Clarina (IE); Isaac Molina Hernandez, Valencia (ES)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 63 days.

(21) Appl. No.: 16/175,101

(22) Filed: Oct. 30, 2018

(65) Prior Publication Data

US 2020/0021776 A1 Jan. 16, 2020

Related U.S. Application Data

(60) Provisional application No. 62/697,620, filed on Jul. 13, 2018.

(51) Int. Cl.
*H04L 1/00* (2006.01)
*H04N 7/10* (2006.01)
(Continued)

(52) U.S. Cl.
CPC ............. *H04N 7/102* (2013.01); *H04N 5/44* (2013.01); *H04N 7/083* (2013.01); *H04N 7/183* (2013.01); *H04N 17/00* (2013.01)

(58) Field of Classification Search
CPC .................................. H04L 1/00; H04L 1/0001
See application file for complete search history.

(56) References Cited

U.S. PATENT DOCUMENTS 3,694,776 A * 9/1972 Linder .................... H03L 7/107  
                                                                      333/17.1  
4,300,161 A    11/1981 Haskell  
(Continued)

FOREIGN PATENT DOCUMENTS

CN       105720582     6/2008  
CN       101330278    12/2008  
(Continued)

OTHER PUBLICATIONS

*To AC-Couple or Not to AC-Couple? That Is the Question!*, Maxim Integrated, Application Note 3768, Mar. 26, 2006, 9 pages.

(Continued)

*Primary Examiner* — Pankaj Kumar  
*Assistant Examiner* — Timothy R Newlin  
(74) *Attorney, Agent, or Firm* — Patent Capital Group

(57) ABSTRACT

Disclosed herein are systems and methods for performing SAG effect compensation on a video signal received over an AC-coupled video link. In one aspect, a method for performing SAF effect compensation includes applying a filter to the received video signal to generate a corrected video signal, where a transfer function of the filter is dependent on a transmission parameter that is based on a plurality of parameters of the AC-coupled link. The method further includes extracting predefined content from the corrected video signal, and adjusting the transmission parameter based on a comparison of the extracted predefined content with certain expected content, so that adjusted transmission parameter can be used for one or more subsequent applications of the filter, thereby realizing an adaptive filter.

20 Claims, 7 Drawing Sheets

(51) Int. Cl.
*H04N 17/00* (2006.01)
*H04N 7/083* (2006.01)
*H04N 5/44* (2011.01)
*H04N 7/18* (2006.01)

(56) References Cited

U.S. PATENT DOCUMENTS

| | | | |
|---|---|---|---|
| 4,333,158 A * | 6/1982 | Voorman | H03H 15/00 |
| | | | 708/819 |
| 4,335,393 A | 6/1982 | Pearson | |
| 4,376,957 A | 3/1983 | Dischert et al. | |
| 4,410,981 A | 10/1983 | Flory | |
| 4,431,976 A * | 2/1984 | Voorman | H03H 21/00 |
| | | | 333/166 |
| 4,467,368 A | 8/1984 | Horstmann | |
| 4,593,318 A | 6/1986 | Eng et al. | |
| 4,633,295 A | 12/1986 | Van De et al. | |
| 4,714,959 A | 12/1987 | Pshtissky | |
| 4,920,515 A * | 4/1990 | Obata | G01R 31/30 |
| | | | 326/16 |
| 5,374,904 A * | 12/1994 | Ishibashi | H03L 7/093 |
| | | | 331/17 |
| 5,471,244 A * | 11/1995 | Wolfe | H04N 5/16 |
| | | | 348/255 |
| 5,559,559 A * | 9/1996 | Jungo | H04N 1/00098 |
| | | | 348/42 |
| 5,617,135 A * | 4/1997 | Noda | H04N 7/147 |
| | | | 348/14.12 |
| 5,623,304 A | 4/1997 | Ota et al. | |
| 5,646,569 A | 7/1997 | Bruhns et al. | |
| 5,701,581 A | 12/1997 | Eto et al. | |
| 6,345,390 B1 | 2/2002 | Eto et al. | |
| 6,711,590 B1 | 3/2004 | Lennon | |
| 7,295,578 B1 | 11/2007 | Lyle et al. | |
| 7,684,433 B2 * | 3/2010 | Shintani | H04N 5/775 |
| | | | 370/463 |
| 8,804,833 B2 * | 8/2014 | Francois | H04N 19/523 |
| | | | 19/523 |
| 8,837,006 B2 | 9/2014 | Byrne et al. | |
| 9,521,455 B1 | 12/2016 | Gupta et al. | |
| 9,813,190 B1 | 11/2017 | Sutskover et al. | |
| 1,025,121 A1 | 4/2019 | Tan et al. | |
| 2005/0174929 A1 * | 8/2005 | Hayashi | H04L 25/022 |
| | | | 370/208 |
| 2005/0249178 A1 | 11/2005 | Bolgiano | |
| 2007/0046786 A1 * | 3/2007 | Tokuyama | H04N 5/357 |
| | | | 348/222.1 |
| 2008/0031383 A1 * | 2/2008 | Magoon | H03C 5/00 |
| | | | 375/300 |
| 2008/0068501 A1 | 3/2008 | Hall | |
| 2008/0069373 A1 * | 3/2008 | Jiang | H04R 3/04 |
| | | | 381/94.1 |
| 2010/0309382 A1 | 12/2010 | Matsubayashi | |
| 2010/0321069 A1 * | 12/2010 | Komatsu | H04L 25/0266 |
| | | | 327/108 |
| 2012/0044599 A1 | 2/2012 | Veskovic | |
| 2012/0212619 A1 * | 8/2012 | Nagamune | H04N 5/2256 |
| | | | 348/164 |
| 2012/0280796 A1 | 11/2012 | Gravelle et al. | |
| 2012/0295564 A1 * | 11/2012 | Chen | H04B 1/28 |
| | | | 455/293 |
| 2012/0320264 A1 * | 12/2012 | Mombers | H04N 5/53 |
| | | | 348/441 |
| 2013/0016768 A1 * | 1/2013 | Lin | H04N 19/176 |
| | | | 375/240.02 |
| 2013/0077697 A1 * | 3/2013 | Chen | H04N 19/176 |
| | | | 375/240.25 |
| 2013/0249779 A1 | 9/2013 | Harada et al. | |
| 2014/0278171 A1 * | 9/2014 | Kahlke | G01R 23/02 |
| | | | 702/64 |
| 2015/0030102 A1 | 9/2015 | Hormis et al. | |
| 2016/0219281 A1 | 7/2016 | Yoshikawa et al. | |
| 2020/0021775 A1 * | 1/2020 | O'Connell | G08C 15/06 |
| 2020/0021776 A1 * | 1/2020 | Cullinane | H04N 7/083 |

FOREIGN PATENT DOCUMENTS

| | | |
|---|---|---|
| CN | 104348493 | 2/2015 |
| CN | 105846684 | 8/2016 |
| CN | 106899212 | 6/2017 |
| CN | 107566308 | 1/2018 |
| CN | 110784675 | 1/2020 |
| DE | 10 2019 119 039 | 1/2020 |
| EP | 3173802 | 5/2017 |

OTHER PUBLICATIONS

*SAG Correction, ON Semiconductor®*, Application Note AND8457, Mar. 2010, http://onsemi.com, 7 pages.
William Stutz, *Get a Grip on Clamps, Bias, and AC-Coupled Video Signals*, Electronic Design, Jan. 18, 2004, www.electronicdesign.com/get-grip-clamps-bias-and-ac-coupled-video-signals, 13 pages.
Wikipedia, HD-MAC, http://en.wikipedia.org/wiki/HD-MAC, 10 pages.
Non-Final Office Action issued in U.S. Appl. No. 16/174,356 dated Nov. 19, 2019, 9 pages.
Non-Final Office Action issued in U.S. Appl. No. 16/172,362, dated Jun. 12, 2019.
Office Action issued in CN Application Serial No. 201910626951.2 dated Aug. 31, 2020, 6 pages.
English Translation (via Patent Translate) of CN101330278 (Bibliographic Data, Description and Claims), 8 pages,
English Translation (via Patent Translate) of CN105720582 (Bibliographic Data, Description and Claims), 16 pages.
English Translation (via Patent Translate) of CN105846684 (Bibliographic Data, Description and Claims), 19 pages.
English Translation (via Patent Translate of CN106899212 (Bibliographic Data, Description and Claims), 31 pages.

* cited by examiner

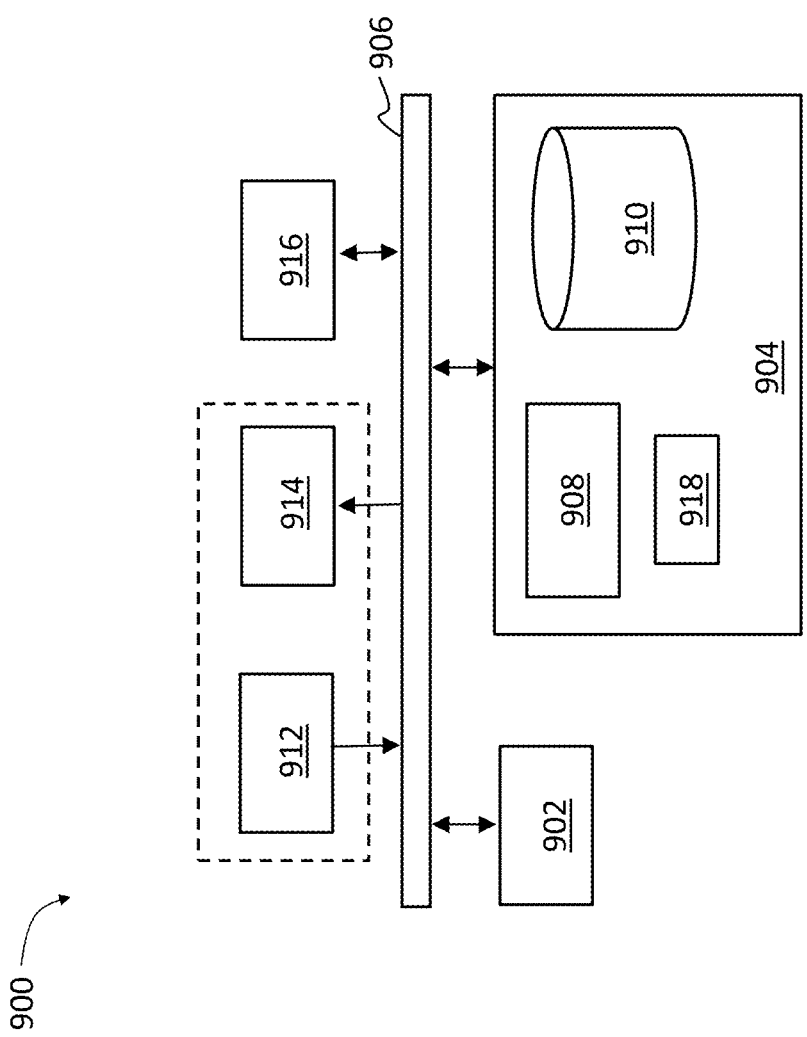

METHODS AND DEVICES FOR COMPENSATING SAG EFFECT

CROSS-REFERENCE TO RELATED APPLICATIONS

This application claims the benefit of and priority from U.S. Provisional Patent Application Ser. No. 62/697,620 filed 13 Jul. 2018, entitled "METHODS AND DEVICES FOR COMPENSATING SAG EFFECT", incorporated herein by reference in its entirety.

TECHNICAL FIELD OF THE DISCLOSURE

The present disclosure relates to the field of video signal transmission, and in particular to analog video signal transmission over alternating current (AC)-coupled channels.

BACKGROUND

Video-based applications which rely on real-time video information acquisition, such as automotive infotainment, automotive driver assistance systems (ADAS), self-driving vehicles and security surveillance systems, generally involve the capture and generation of video data by one or more cameras. Such cameras may include, for example, charge-coupled devices (CCDs), complementary metal-oxide-semiconductor (CMOS) image sensors, or any other suitable video capturing devices which, broadly speaking, translate photons incident thereon into digital (raw or pixel) video data. In such applications, the video data will usually have to be transmitted in real-time from the camera to other devices for processing. Such devices may include, for example, electronic control units (ECUs) or components in communications or alerting systems. Such devices may, for example, execute specialized software to perform processing and analytical tasks based on the acquired image and/or video data and provide outputs accordingly. The combination of layers of transmission infrastructure enabling the transfer of the data between the camera and the video data receiving device/processor may be referred to as a "video link" or a "camera link."

A variety of factors can affect the cost, quality and robustness of a video link. Physical constraints such as space/surface area and also regulations can pose further constraints to the video link requirements or specifications, and thus trade-off and ingenuity will have to be exercised.

BRIEF DESCRIPTION OF THE DRAWINGS

To provide a more complete understanding of the present disclosure and features and advantages thereof, reference is made to the following description, taken in conjunction with the accompanying FIGS., wherein like reference numerals represent like parts, in which:

FIG. 9 provides a block diagram illustrating an example data processing system in accordance with some embodiments of the present disclosure.

DETAILED DESCRIPTION

Overview

Figure 1:
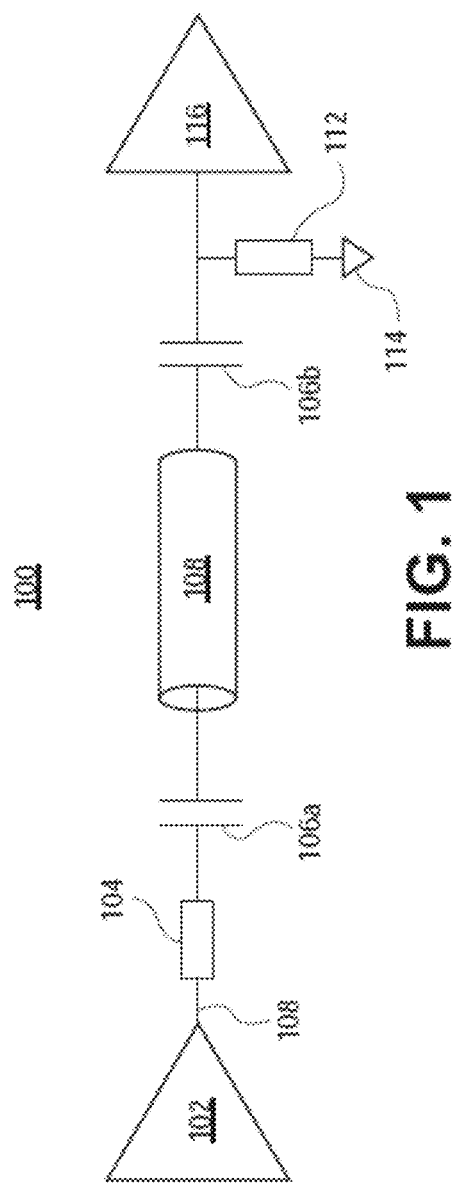
FIG. 1 shows a schematic example of an AC-coupled circuit in a single-ended transmission scheme in accordance with some embodiments of the present disclosure.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Disclosed herein are systems and methods for performing SAG effect compensation on a video signal received over a wired, AC-coupled video link (in the following, the term "link" may be used interchangeably with the terms "channel" and "cable"). Such systems and methods may be particularly suitable for, but are not limited to, being used in a vehicle (where the term "vehicle" includes not only wheeled vehicle such as a car, a truck, or a bus, but also includes an airplane, an aircraft, or a spacecraft, for example), in a surveillance system, or in any other environment where a transmitter, placed at one location within such an environment (e.g., within a vehicle) and configured to receive a video signal acquired by an image sensor in a camera that is communicatively coupled to the transmitter, and a receiver, placed at another location within such an environment, may need to communicate video signals and other data with one another over a wired link. Furthermore, while this disclosure mainly describes video links and video signals, other types of signals such as audio, image, or any combination thereof, which are transmitted over an AC-coupled analog transmission channel may be corrected on the receiver side using the SAG compensation techniques disclosed herein.

In one aspect of the present disclosure, a method for performing SAG effect compensation includes applying a filter to a video signal, received over the AC-coupled link, to generate a corrected video signal, where a transfer function of the filter is dependent on a transmission parameter (α parameter) that is based on a plurality of parameters of the AC-coupled link. The method further includes extracting predefined (i.e., known) content from the corrected video signal, and adjusting the transmission parameter based on a comparison of the extracted predefined content with certain expected content (i.e., expected predefined/known content), so that adjusted transmission parameter can be used for one or more subsequent applications of the filter, thereby realizing an adaptive filter. Using an adaptive filter to compensate for the SAG effect may advantageously allow accounting for changes in the values of the parameters of the AC-coupled link due to one or more of process, voltage, and/or temperature (PVT) variations, resulting in improved SAG compensation results, compared to prior art approaches.

Other aspects of the present disclosure provide methods for operating such a system, as well as computer-readable storage media storing instructions which, when executed by a hardware processor, cause the processor to carry out the SAG compensation techniques as described herein.

As will be appreciated by one skilled in the art, aspects of the present disclosure, in particular aspects of SAG compensation based on the use of an adaptive filter as proposed herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing analog transmission systems, in particular—analog video transmission systems that use AC-coupling, including transmitters, receivers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Other features and advantages of the disclosure will be apparent from the following description and the claims.

Analog vs Digital Video Transmission

In systems requiring the transfer of video data between system elements (e.g., between an image sensor and a processor implemented at a certain distance from the image sensor), such as surround view ADAS or (security) surveillance systems, the video data acquired by a camera can be transmitted in digital form, e.g., as a serialized digital bit stream, which can be, e.g., as RAW data as acquired by the image sensor or in some processed form, e.g., YUV data produced by an image system processor (ISP) performing de-mosaicking on the RAW image sensor data. Alternatively, the video data can be acquired by a camera may be converted and formatted into an analog signal prior to transmission, and then transmitted in analog form.

Analog video signal transmission can be advantageous when contrasted to digital transmission. The serialized nature of digital transmission results in digital transmission requiring higher bandwidth than analog transmission. To satisfy the higher bandwidth requirement, more expensive infrastructure is required. Also, while bit accuracy is maintained in digital transmission and may be compromised in analog transmission, the impact of errors that do occur in a digital transmission can be much more impactful than those that occur in analog transmission in terms of the output video quality as perceived by a human viewer. Thus, transmitting the original digital video data as an analog signal offers several advantages over digital signal transmission. A system based around analog transmission may offer reduced cost and a more robust transmission signal. Thus, while the image sensor will generally output digital video data, this may be converted into an analog signal for transmission over an analog video link to a receiver for further processing.

AC-Coupled vs DC-Coupled Analog Transmission

In implementing analog signal transmission over a wired transmission line, a choice can be made between AC and DC-coupling (the latter also referred to as "conductive coupling").

AC-coupling requires the use of at least one coupling capacitor, which is an additional component compared to DC-coupling where such capacitors are not required. An AC-coupled wired transmission line between a transmitter and receiver typically includes a first coupling capacitor, placed after the transmitter and prior to the transmission channel, and a second coupling capacitor, placed after the transmission channel and prior to the receiver. The term "coupling capacitor" as used herein may refer to one or more coupling capacitors. By contrast, in DC-coupling, only resistors or simply wire(s), and no coupling capacitors, are used and, therefore, DC-coupling is generally favored due to its simpler implementation and lower cost and space requirements.

Furthermore, the coupling capacitor(s), together with the termination resistors at either end and with the impedance of the wired transmission cable, may act as a high-pass filter and, thus, may attenuate the transmission of lower frequency components of the analog signal. This is relevant to the transmission of video signals, as the frequency spectrum of such signals often includes DC level and low-frequency elements which would be vulnerable to such high-pass filtering, resulting in loss or distortion of picture information. Thus, it is desirable that a video signal can be preserved down to very low frequency and down to the DC level components. This means that coupling capacitor(s) used for AC-coupling may need to be very large in order to minimize the cutoff frequency of the high-pass filter formed with the receiver termination. Some implementations of AC-coupling may require capacitances as large as about 220 microfarad (uF) to preserve those lower frequency components. Therefore, AC-coupling may be regarded as an undesirable option due to prohibitively large capacitor size requirements.

However, AC-coupling can be advantageous in certain applications as it provides improved tolerance against some fault conditions. This is the case, for example, in automotive/vehicle applications, in which reducing the risk of damage during a short-to-battery (STB) fault condition may be a motivation for AC-coupled video links because, as they block DC voltage levels, AC-coupled links are intrinsically resistant to STB faults. On the other hand, DC-coupling of the transmitter output buffer to the transmission medium can be challenging due to the requirement to be robust to STB fault conditions, which may require the transmitter devices to be designed and manufactured on a high-voltage semiconductor process technology, which is typically more expensive than standard (low-voltage) semiconductor processes technology. Thus, transmitting video signals in an AC-coupled analog signal format can be a cost-effective and robust transmission option, particularly in automotive applications. Furthermore, the SAG compensation techniques as disclosed herein may advantageously enable the use of smaller capacitor sizes in an AC-coupled transmission line.

Single-Ended vs Differential-Pair AC-Coupled Analog Transmission

An AC-coupled transmission line for transfer of video data can be implemented according to either a single-ended or a differential-pair transmission scheme. In some implementations, differential-pair video transmission may be particularly advantageous as it may benefit from a stronger immunity to noise compared to single-ended video transmission.

In a single-ended implementation of an AC-coupled transmission line, a respective coupling capacitor may be placed in each of the two sides of a single-ended transmission line, i.e., one coupling capacitor between a transmitter and a conductor cable of the line, and another coupling capacitor between that conductor cable and a receiver. In a differential implementation of an AC-coupled transmission line, a respective pair of coupling capacitors may be placed in each of the two sides of a differential-pair transmission line, i.e., a pair of coupling capacitors between a transmitter and a conductor cable of the line, and another pair of coupling capacitors between that conductor cable and a receiver. In various embodiments, a conductor cable (or simply "cable") may be implemented in any suitable cabling scheme, e.g., as a single conductor (i.e., a conductor wire), as a coaxial cable, or as a dual conductor such as unshielded twisted pair (UTP) or shielded twisted pair (STP), depending on the transmission scheme used (i.e., depending on whether the transmission scheme is single-ended or differential-pair). In some embodiments, the cable of a video transmission channel may include an RCA-type cable or a coaxial cable (which includes a signal wire at least partially enclosed within a shield of conductive material), or an unshielded AVSS, CIVUS or similar signal wire, within a shielded bundle.

Figure 2:
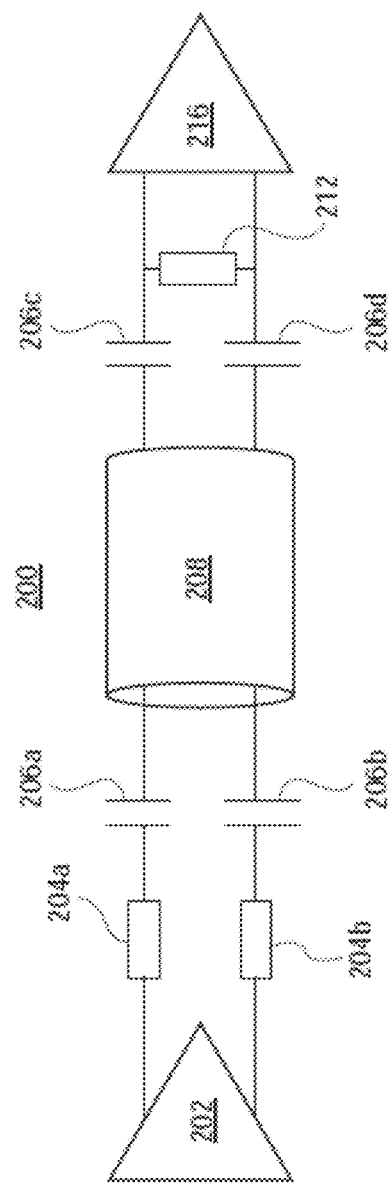
FIG. 2 shows a schematic example of an AC-coupled circuit in a differential transmission scheme in accordance with some embodiments of the present disclosure.

FIGS. 1 and 2 show schematic examples of a single-ended and a differential-pair transmission channels, respectively.

In an AC-coupled transmission scheme 100 shown in FIG. 1, a signal, which may comprise an analog-formatted video signal, is transmitted over a single conductor cable 108, which may be seen as a transmission channel 108. In some embodiments, the conductor cable 108 may include a simple conducting wire. In some embodiments, the conductor cable 108 may include a coaxial cable that includes a core conductive wire and a conductive shield, with the core wire carrying the video signal and the shield being grounded. Since the transmission scheme 100 is a single-ended signaling transmission scheme, only a first wire carries a varying voltage between the transmitter and receiver, while a second wire conductor (not shown in FIG. 1) may be connected to and carry a reference voltage signal (such as that provided by a ground reference 114 shown in FIG. 1). As shown in FIG. 1, the conductor cable 108 connects a transmitter 102 and a receiver 116. In this scheme, one or more coupling capacitors 106a, 106b may be connected between the transmitter 102 and receiver 116. In particular, one or more coupling capacitors 106a may be connected between the transmitter 102 and the conductor cable 108, and one or more coupling capacitors 106b may be connected between the conductor cable 108 and the receiver 116. The transmitter 102 may exhibit a total resistance 104 (which may be serially connected to the transmitter 102, as shown in FIG. 1, although in other embodiments the connection could be parallel) while the receiver 116 may exhibit a total resistance 112 (which may be in parallel connection with the receiver 116 in some embodiments, as shown in FIG. 1).

Alternatively, in an AC-coupled transmission scheme 200 shown in FIG. 2, a signal, which may comprise an analog-formatted video signal, is transmitted over a differential-pair conductor cable 208, which may be seen as a transmission channel 208. In some embodiments, the conductor cable 208 may include a UTP or an STP cable. While single-ended implementation can be advantageous due to its simpler implementation and lower cost, differential-pair signaling transmission schemes may advantageously offer resistance to external electromagnetic interference (EMI) and reduce the amount of electromagnetic emissions produced by the link. This is because the properties of the two separate signals/lines of the differential-pair of lines can be selected so as to provide cancellation of common mode interfering signals. As shown in FIG. 2, a transmitter 202, which may exhibit resistances 204a and 204b (which may be serially connected to the transmitter 202, as shown in FIG. 2, although in other embodiments the connection could be parallel) in the two lines of the differential-pair scheme, is connected to the conductor cable 208 via a pair of coupling capacitors 206a, 206b. Similarly, a receiver 216 is coupled to the conductor cable 208 via a resistance 212 (which may be in parallel connection with the receiver 216 in some embodiments, as shown in FIG. 2) and a pair of coupling capacitors 206c, 206d.

SAG: The Undesirable Effect of AC-Coupling

As shown in FIGS. 1 and 2, both the transmitter and receiver may be AC-coupled to the conductor cable or wire (the terms wire and cable may be used interchangeably herein). While AC-coupling (whether in a single-ended or a differential-pair implementation) may provide significant robustness, risk and cost benefits, particularly on the transmitter side, it may also present significant challenges in transmission of analog video data.

As briefly described above, one source of the challenges is due to the presence of coupling capacitors used for AC-coupling, because such capacitors form high-pass filters with the termination resistors at either end of the conductor cable. For example, in a 50 Ohm system with 1 uF coupling capacitors, the cutoff frequency of the high-pass response may be about 3 kilohertz (kHz), which means that signal components with frequencies below 3 kHz may lose significant signal amplitude when transmitted through the coupling capacitors. Increasing the size of the coupling capacitors may somewhat decrease the cutoff frequency, but that is not always possible or feasible due to, e.g., cost and space considerations (e.g., the maximum size of the coupling capacitors may be limited by the available board space).

Not being able to pass signal components below a certain frequency is particularly problematic for video signals, the spectral content of which often includes low frequency and DC level components, which may stem from the manner in which video data is typically formatted. Although well-known in the art, a brief explanation of example formatting of video data is provided below.

In a typical camera, color is produced by filtering the light hitting each photosite (or pixel) to produce either red, green or blue values. The arrangement for the different colors (i.e., color pattern) of the photosites most often used is a so-called "Bayer pattern." RAW data of a single image acquired by a camera (where a video is a sequence of images) like this represents the value of each pixel, for pixels of different colors. In other words, for a single image, RAW data may include pixel values for all red pixels (i.e., pixels configured to filter the incoming light to detect wavelengths in the spectrum associated with red color), pixel values for all green pixels (i.e., pixels configured to filter the incoming light to detect wavelengths in the spectrum associated with green color), and pixel values for all blue pixels (i.e., pixels configured to filter the incoming light to detect wavelengths in the spectrum associated with blue color). Each pixel may be characterized by, inter alia, an intensity or magnitude, and is represented by a number of bits (e.g., 10 bits) used to represent a magnitude of a signal acquired/stored in a particular pixel for a particular component.

RAW data may be processed to form components which are then transmitted in a video signal. For example, red, green, and blue values, or some processed version of those values, are one example of different components of an acquired image, together referred to as "RGB" color space. RAW data may interpolated, a process known as de-mosaicking, and then be transformed to other types of color spaces by an ISP, e.g., in "YUV" color spaces, where Y is a luminance component, carrying the intensity of light information, and U and V are chrominance components, carrying the color information. A video frame may be composed of a matrix of individual pixels of one or more components. In some embodiments, different components may be transmitted by different channels. Unless specified otherwise, descriptions provided herein may refer to pixel values of a certain component or a combination of components.

The pixel values of a video frame (the pixel values or pixels sometimes referred to as "active pixels" to indicate that they contain values representing a video frame as acquired by a camera) may be grouped into horizontal lines, and these horizontal lines may be grouped, or stacked, vertically to form a video frame. The screen is built up scanline by scanline, by sending the pixel values, represented by appropriate component values (e.g., RGB or YUV values), over the video link. However, only having a stream of components, e.g., a stream of RGB colors, is not sufficient to know which part of the stream belongs to a particular pixel (e.g., the top-left pixel) on a display. To solve this, two more signals are added to the video signal containing the values of active pixels to be transmitted—one is a signal containing horizontal synchronization ("horizontal sync") pulses and another one is a signal containing vertical synchronization ("horizontal sync") pulses. A horizontal sync pulse provides a reference for different video lines (i.e., it provides an indication of a start-of-line point), while a vertical sync pulse provides a reference for different video frames (i.e., it provides an indication of a start-of-frame point). A horizontal sync pulse (or, simply, "horizontal sync") may be a pulse inserted into a video signal before a stream with pixel values for a given horizontal line begins or/and when a horizontal line is done (but is typically inserted before a horizontal line begins). In between two consecutive horizontal sync pulses active pixel data for the line (i.e., pixel values representative of the line of the video frame) is included. A vertical sync pulse (or, simply, "vertical sync," also sometimes referred to as a "vertical retrace") may be a pulse or sequence of pulses inserted into a video signal when all horizontal lines of a given video frame have been completed or/and when before horizontal lines of a new video frame begin. Thus, each frame boundary may be demarcated by a single vertical sync pulse or sequence of pulses. Since each line of a frame has the same number of pixels, the time between consecutive horizontal sync pulses is a constant. Since each full frame (i.e., a frame with all of its lines) has the same number of pixels, the time between consecutive vertical sync pulses is a constant. In this manner, horizontal and vertical sync pulses allow determination of which color component of the video signal belongs to which position to be displayed on the screen. All common analog video transmission schemes mimic this organization of the pixels in a frame and mark the start-of-line and start-of-frame times with a horizontal sync and vertical sync pulses, respectively.

Figure 3:
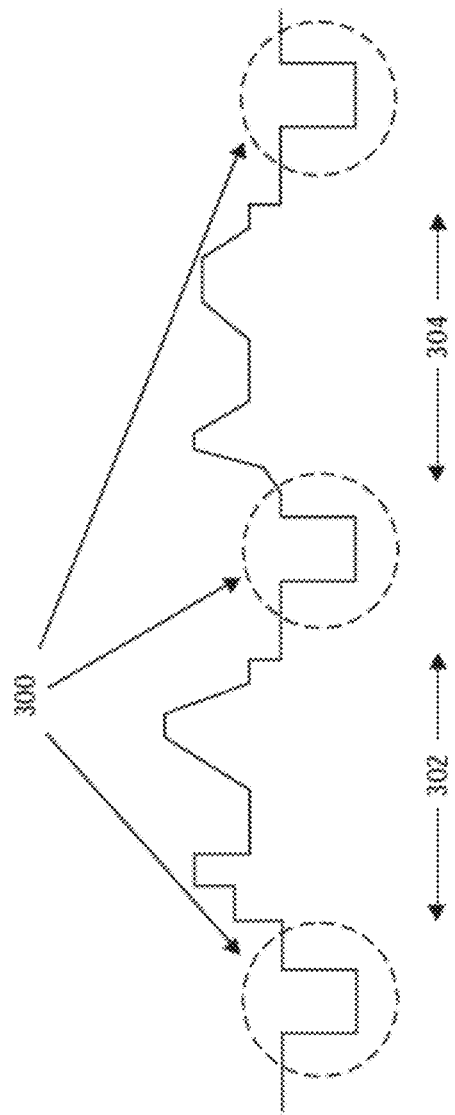
FIG. 3 is a schematic depiction of a video signal during an ideal transmission in which the signal is not subject to the signal amplitude gain (SAG) effect.

FIG. 3 illustrates a simplified example of an analog (video) signal showing how horizontal sync pulses 300 may be included into the video signal to be transmitted. As shown in FIG. 3, between each two consecutive horizontal sync pulses 300, active pixel data may be included, labeled in FIG. 3 as video lines 302 and 304 (i.e., lines which carry the video data). The pulses 300 are referred to as horizontal sync pulses due to the fact that they indicate the starting point for the active pixel values that would be rendered as a horizontal pixel line. Vertical synchronization lines (not shown in this example) indicate the beginning of a new video frame (within which the plurality of subsequent horizontal pixel (data) lines will share a common vertical start point). Typically, but not necessarily, the horizontal sync pulses occupy the lowest portion of the signal range. A flat portion immediately before the horizontal sync pulse is referred to as a "front porch" and a horizontal portion immediately after the horizontal sync pulse is referred to as a "back porch", which portions are set to certain predefined signal levels (e.g., both may be set to a zero voltage level) and may then be used to identify the horizontal sync pulses.

Figure 4:
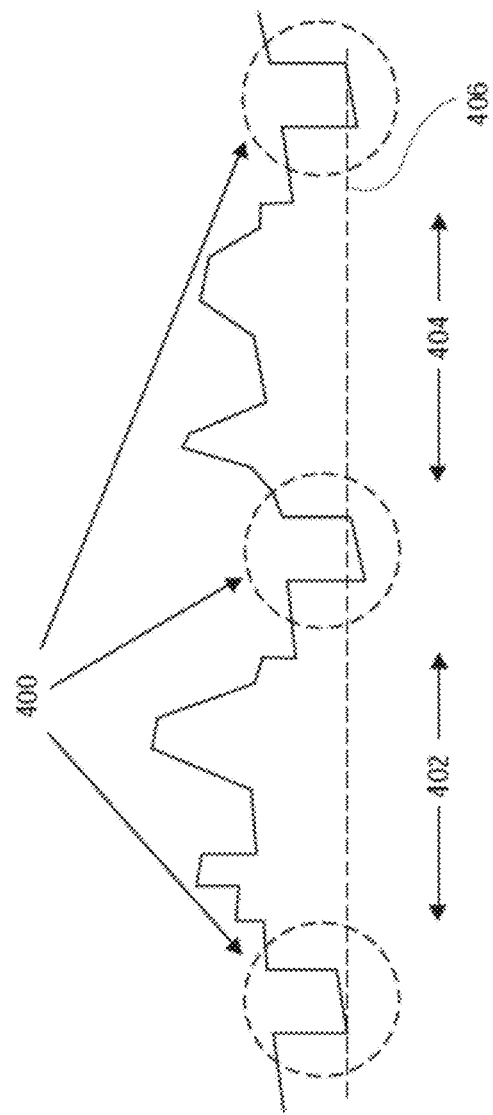
FIG. 4 is a schematic depiction of a video signal exhibiting the SAG effect during transmission over an AC-coupled system.

The example of FIG. 3 shows an ideal transmission scenario in which the horizontal sync pulses maintain their original level. However, when these (electrical) pulses are transmitted over an AC-coupled channel, their flatness or level may deteriorate (i.e., their constant magnitude throughout a specified duration will not be maintained and will deteriorate) because the coupling capacitor(s) will delay passage of the electrical charge, thereby causing what graphically appears like a drooping or sagging of the otherwise horizontal pulse (i.e., straight lines become curved). Such an undesirable effect caused by using the coupling capacitors is commonly referred to as a signal amplitude gain (SAG) effect (or simply "SAG" or "sagging"). The SAG effect can be characterized as a gradual increase or decrease in the level of the video signal across its horizontal (i.e., DC level) components in a way that is dependent on its amplitude. When a horizontal pulse is a low value, the SAG will result in the magnitude of the pulse gradually increasing. When a horizontal pulse is a high value, the SAG will result in the magnitude of the pulse gradually decreasing. While the first value of a horizontal pulse may remain unaffected, subsequent points gradually increase when the pulse is low or gradually decrease when the pulse is high. This effect is shown in FIG. 4, where the level of the horizontal sync pulses 400 are shown to droop or sag (hence, the terms "sagging" and "SAG effect") with respect to a reference line 406 which indicates the intended flat level. As can be seen in FIG. 4, the same behavior may be exhibited by the values of the active pixels.

The SAG effect originates from the fact that the coupling capacitor(s) used for AC-coupling effectively act as high-pass filters, letting high frequency components through while altering the amplitude of lower frequency components. The magnitude of the effect depends on the total series capacitance of the one or more coupling capacitors, as well as the value of the termination impedance employed. This will naturally affect the quality of the transmitted low frequency signals, and is particularly detrimental to video signals, which are formatted to have a DC component, and may significantly impact the quality and fidelity of the rendered/displayed output.

Current Methods of Addressing the SAG Effect

Current or known methods of addressing SAG are generally aimed at preventing the effect with measures prior to transmission of the signal.

The cutoff frequency of a high-pass filter formed by a coupling capacitor is related to the coupling capacitor's capacitance, where a smaller capacitor is more effective at blocking lower frequency signals, thereby increasing the distortion on the intended video signal. Therefore, one preemptive approach is to reduce SAG by providing as large a capacitance as possible, as the greater the capacitance the lower the SAG cutoff frequency, thus allowing a wider range of lower frequency pass-through and hence the lesser the degradation of the DC components. However, not only is this approach not fully effective, as some SAG will always remain (due to the practical impossibility of having a 0 Hz cutoff frequency), but it has the significant drawback that the greater the capacitance the greater the board area that will be needed to accommodate the coupling capacitor. As a result, implementation of this SAG reduction approach can be costly and/or spatially prohibitive in many applications.

Another SAG reduction approach is to apply a low-frequency boost to the analog video signal at the pre-transmission stage by employing an amplifier within a feedback loop. This enables a smaller coupling capacitor to be used. However, this approach may lead to problems with saturation of the output signal, which may affect its dynamic range, which may be unacceptable in many applications.

Thus, known approaches to addressing the SAG effect suffer from drawbacks which lead away from use of AC-coupling and which present AC-coupling as less desirable or less favored compared to DC-coupling. In contrast, embodiments of the present disclosure provide a feasible and effective approach to SAG compensation.

SAG Compensation Methods and Devices

Embodiments of the present disclosure provide methods and devices to effectively address the SAG effect arising during video information transmission, which methods and devices may also be applied to other types of media or signals. The steps are discussed herein in reference to an exemplary digital implementation, but alternatively analog extraction circuits may also be implemented to effectuate the SAG compensation as described herein.

Systems, methods, devices, and non-transitory computer-readable media for encoding, transmitting, decoding and receiving one or more signals are described herein. The various embodiments of the present disclosure may be implemented or deployed alone or in combination. While exemplary embodiments are explained herein in relation to video information signals, various embodiments of the present disclosure may be applied to a diverse range of types of information signals, such as, but not limited to, video and audio information combination signals and combined media (e.g. video, audio, etc.) and control data signals, without departing from the scope of the present disclosure. Embodiments of the present disclosure may be implemented or deployed in a wide range of systems, applications, and/or environments, such as, but not limited to, automotive infotainment, ADAS, self-driving vehicles, security surveillance systems, and CCTV systems.

SAG Compensation Using Adaptive Filtering

Figure 5:
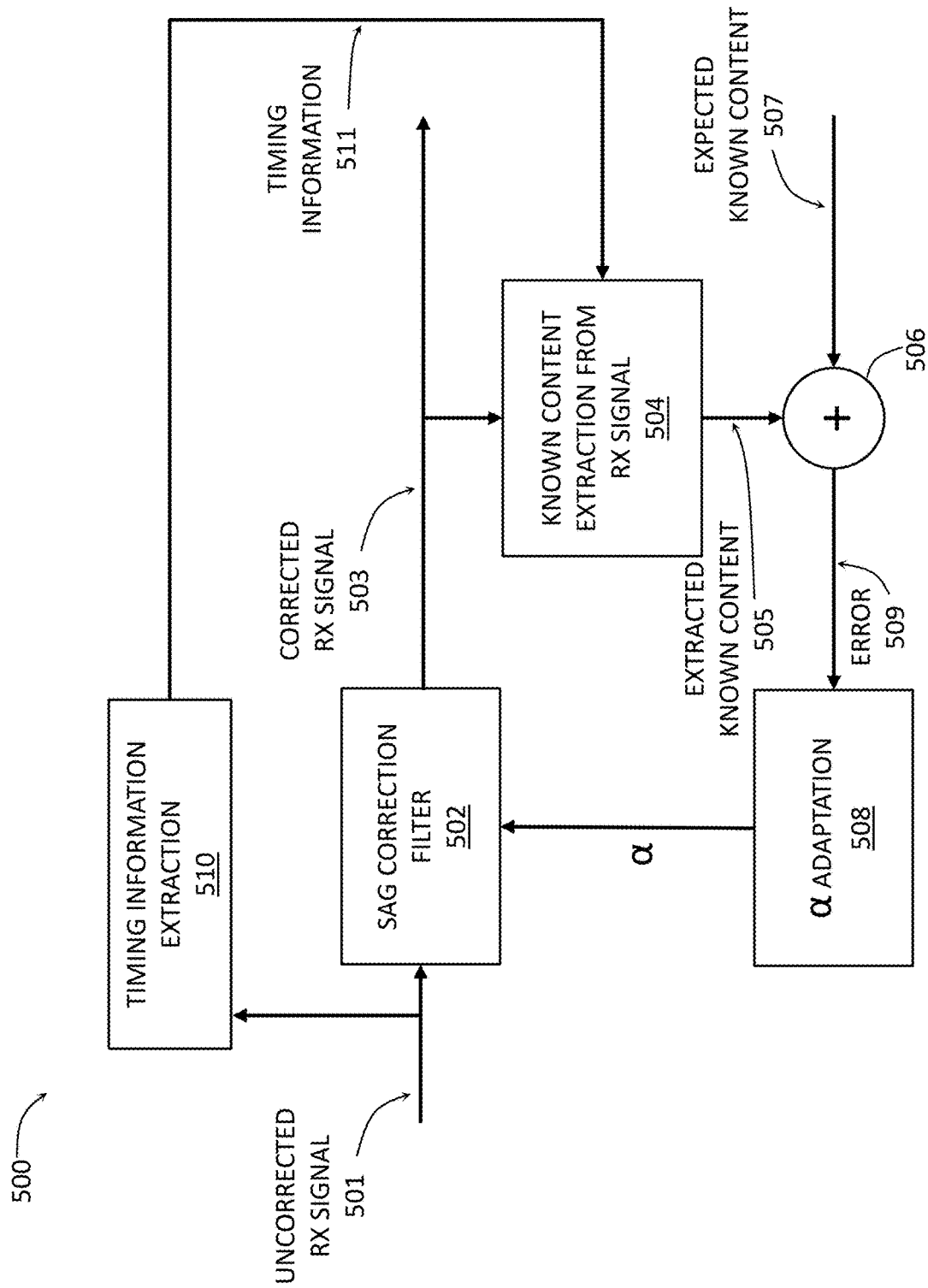
FIG. 5 is a flowchart of an adaptive method of compensating for the SAG effect in a received signal in accordance with some embodiments of the present disclosure.

FIG. 5 is a flowchart of an adaptive method 500 of compensating for the SAG effect in a received signal in accordance with some embodiments of the present disclosure.

The method 500, in whole or in part, can be implemented using, for example, a video system 800 shown in FIG. 8, and/or a data processing system 900 shown in FIG. 9, described below. However, in general, the method 500 can be implemented using any system other than a video system, in which a signal acquired by a sensor, or generated in any other manner, on the transmitting side is transmitted, by a transmitter, to a receiver, over an AC-coupled wired link, to be processed and possibly reproduced on the receiving side.

As shown in FIG. 5, the method 500 may begin with a video receiver, e.g., the receiver 820 shown in FIG. 8 and described in greater detail below, receiving a video signal 501 over the AC-coupled transmission link/channel, e.g., over the link 830 shown in FIG. 8. As described above, the video signal is likely to be deteriorated due to the AC-coupled transmission, something that is to be corrected using the SAG compensation techniques described herein. For that reason, therefore, the received video signal 501 may be referred to as an "uncorrected" received (RX) signal 501. The uncorrected received signal 501 may be provided to a SAG correction filter 502, which, in various embodiments, may be implemented as a digital filter or as an analog filter, as described in greater detail below.

Inventors of the present disclosure realized that, in order to correct for the SAG effect in the received video signal, the effects that the AC-coupled channel (e.g., the AC-coupled link 830, shown in FIG. 8) may impart on transmitted signals may be modeled, then this effect may be inverted in an attempt to negate or counteract, at least partially, these effects. Inventors of the present disclosure further realized that using an adaptive filter may allow adapting for the non-idealities in the model. Thus, the SAG correction filter 502 has a transfer function that is designed to realize an inversion of the transmission channel effects, thus attempting to invert, or at least reduce, the negative effects of sagging. The analog channel model (i.e., the model of the transmission channel, e.g., of the AC-coupled link 830) and the transfer function of the SAG correction filter 502 are described in greater detail below in a designated sub-section entitled "AC-coupled channel model and transfer function of the SAG correction filter." As will be shown, the transfer function of the SAG correction filter 502 may depend on a parameter α, which may be referred to as a "transmission parameter" or "α parameter," which parameter, in turn, depends on several parameters of the AC-coupled link 830, such as a combination of resistances and capacitances of the AC-coupled link 830.

As a result of applying the SAG correction filter 502 to the uncorrected RX signal 501, the uncorrected RX signal 501 may be at least partially corrected for the SAG effect and may then be provided at the output of the SAG correction filter 502 as a "corrected" RX signal 503. In some embodiments, the corrected RX signal 503 may be used for video consumption as such, e.g., by the video consumption device 822 shown in FIG. 8.

However, the value of the α parameter used by the SAG correction filter 502 may not be optimal at that point because assumed parameters of the AC-coupled link 830 may vary slightly, e.g. because of process, supply voltage, or temperature variations in the circuit. In other words, because α is dependent on analog parameters of resistance and capacitance which may vary with factors such as system temperature and parasitic elements, it can be advantageous to monitor its value and adjust it accordingly. Therefore, in some embodiments, the method 500 proceeds with the adaptive portion where the α parameter is adapted, as shown in FIG. 5 with blocks 504, 506, and 508. According to some embodiments, adaptation of the α parameter may be effectuated by using certain predefined, i.e. known to the transmitter and the receiver, content into the video signal prior to transmission of the video signal, which known content may then be used to identify whether the initial (or the latest) value of the α parameter has been over- or under-estimated in the receiver.

In particular, adaptive filtering portion of the method 500 using the predefined known content may include providing the corrected RX signal 503 to the block 504, in which the known content is extracted from the corrected received signal 503, as shown in FIG. 5. There are several variations of what a "known content" included in the video signal prior to transmission over the AC-coupled channel may include. Some example variations will now be described, but, in general, any type of content that may be inserted into a video signal prior to transmission over the AC-coupled channel in order to enable the receiver to determine how the α parameter is to be modified is within the scope of the present disclosure.

In some embodiments, the "known content" may include known one or more lines deliberately inserted into the video signal prior to transmitting the video signal over the AC-coupled link 830. These lines may be referred to as (predefined) test lines and may, for example, simply include a flat level transmitted by the transmitter. In some embodiments, the test lines may alternate between high and low levels on subsequent video pixel lines. In some embodiments, the test lines may have differing average values, and in some embodiments the difference in average value of the test lines can be significant, which may be used to increase the magnitude of the error when compared to the known signal, improving the ability of the adaptive loop to accurately correct for the response of the AC-coupled link. In some embodiments, the test line comprises a plurality, for example four, wide-band pulses. In some embodiments, the four wide-band pulses may then be averaged in order to reduce noise before the adaptation algorithm of the block 508, described below, is applied.

In some embodiments, the "known content" may include or be a certain number of pulses of constant or various amplitudes. In some embodiments, one or more of the synchronization pulses themselves may serve as such "known content". In other words, in such embodiments, the timing pulses (i.e., horizontal and/or vertical sync pulses) themselves can serve as reference levels once their positioning is determined, e.g., from the synchronization slicing step 610, described in greater detail below. In other embodiments, one or more additional pulses of constant or various amplitudes may be inserted into the video signal in addition to the active pixel values and the synchronization pulses, to provide the "known content" to be evaluated at the receiver in order to adapt the α parameter.

In some embodiments, a dedicated test line/pulse insertion module may be used to insert the known content into a video signal prior to its transmission over an AC-coupled link. In some embodiments, the known content may be inserted in a vertical blanking interval (VBI) slot between (adjacent) video frames. Alternatively or additionally, the one or more instances or portions of the known content may be periodically inserted into the digitized signal as a whole, prior to its' conversion to analog signal for transmission over the AC-coupled link. In some embodiments, the known content may be inserted following a predefined periodicity P, such that a new instance of the known content is inserted after, e.g., every 5 (or any other suitable number of) active video pixel lines. Such embodiments may advantageously enable control of the intensity of the monitoring effort by the receiver and can be selected to suit the needs of specific applications.

Provided that the known content has been inserted into the video signal prior to the transmission, and provided that the receiver has information indicating what the known content is and where it is to be found within the video signal (i.e., provided that the receiver can obtain the expected known content 507, as shown in FIG. 5), the receiver may be configured to detect where this known content is positioned in the video signal (e.g., where the known content is positioned in a given frame of the video signal). Based on the comparison of the known content detected in the received signal, or "extracted" from the received signal, and based on the receiver having information as to what is expected to be in the known content, the receiver can determine the direction and magnitude of the SAG effect across this known content (e.g., by comparing the expected corrected magnitude and the actual SAG effect on the known content extracted from the received video signal 503) and use that information to calibrate the α parameter. To that end, the α parameter may be decreased or increased, as needed, to better correct for the loss (due to the SAG effect) on the actual video content. Adjusting the α parameter in this manner advantageously allows for flexible adaptation of the SAG correction filter 502 to, for example, account for any temporary artefacts that may be affecting the transmission channel. The process of using the known content to adjust the α parameter will now be described in greater detail with reference to blocks 506 and 508.

In block 506, the extracted known content 505 (i.e., the known content extracted from the corrected received signal 503) may be compared with certain expected content 507 of which the receiver is aware, and a result of the comparison may be referred to as "error" 509. The error 509 is then provided to the block 508 in which the error 509 is used to adapt the α parameter. For example, in some embodiments, the adaptation may be such as to minimize the error 509. In various other embodiments, other criteria for the adaptation may be assumed, as long as they result in bringing the value of the α parameter used by the SAG correction filter 502 to closer resemble the actual channel characteristics of the AC-coupled link 830.

In some embodiments, a threshold T may be established, or predefined, and the receiver may be configured to compare the difference between said threshold and the measured SAG effect on the known content (where, again, the SAG effect may be measured by comparing, e.g. by determining the difference between, the extracted known content 505 to the expected known content 507) in order to determine whether to update the α parameter in block 508. The SAG effect, as represented by the error 509, may, thus, be continuously minimized.

In some embodiments, a threshold may also be established which defines the tolerable or acceptable SAG effect (i.e. some amount of the error 509 may be acceptable, which means that it does not require adaptation of the value of the α parameter), and the receiver may be configured to compare the difference between said threshold and the measured SAG effect in order to determine whether or not to update the α parameter. In various embodiments, the receiver may be configured so that the threshold or tolerance level may be adjusted according to the specific application needs.

It should further be noted that, in various embodiments, not every instance of the known content is monitored, and a monitoring frequency may be predefined. For example, in some embodiments, the receiver may be configured to monitor or compare only every 10th instance of the known content, or even $10^{th}$ test pulse, for example.

As a result of performing the adaptation of the α parameter in the block 508, an adapted value of α parameter is provided to the SAG correction filter 502, to be used in subsequent applications of said filter, thus realizing an adaptive filtering algorithm that is based on using certain predefined content within the video signal. In some embodiments, the operations of blocks 502, 504, 506, and 508 may be performed iteratively in order to optimize SAG reduction.

Turning back to the block 504, in order to extract known content from the corrected received signal 503, timing information indicating where, within the video signal 503, said known content is to be found. In some embodiments, as shown in FIG. 5, block 510 may be configured to obtain such timing information based on the uncorrected received signal 501, and provide the result as timing information 511, to the known content extraction block 504. In other embodiments, not specifically shown in FIG. 5, block 510 may be configured to obtain the timing information 511 based on the corrected received signal 503 instead. In still further embodiments, also not shown in FIG. 5, the timing information 511 may be obtained based on a combination of the uncorrected received signal 501 and the corrected received signal 503 (i.e., based on a combination of a coarse and fine embodiments). In some embodiments, the timing information 511 may be obtained using the method 600 shown in FIG. 6 and described below. While FIG. 6 is described with reference to the received signal being the uncorrected RX signal 501, these descriptions are also applicable to the received signal being the corrected RX signal 503, or any combination of these two signals.

Generation of Timing Information for SAG Compensation Using Adaptive Filtering

Figure 6:
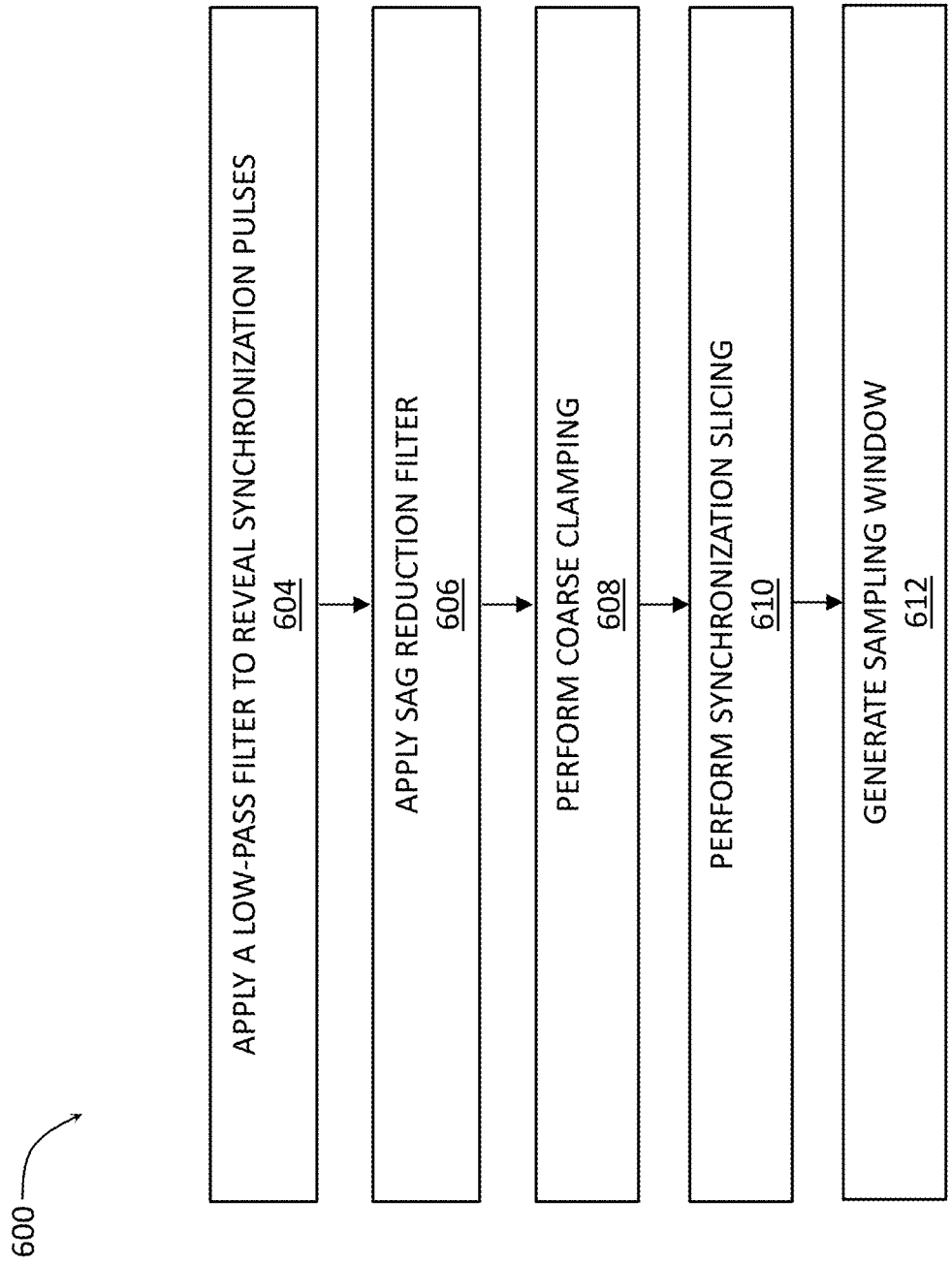
FIG. 6 is a flowchart of a method for generating timing information used for extracting known content from a received signal in accordance with some embodiments of the present disclosure.

FIG. 6 shows a flowchart of a method 600 according to some embodiments of the present disclosure discussed herein for adaptive filtering and line retrieval. In particular, the method 600 may be used for generating the timing information 511 used for extracting known content from a received signal in the block 504 of the method 500.

Similar to the method 500, the method 600, in whole or in part, can be implemented using, for example, a video system 800 shown in FIG. 8, and/or a data processing system 900 shown in FIG. 9, described below. However, in general, the method 600 can be implemented using any system other than a video system, in which a signal acquired by a sensor, or generated in any other manner, on the transmitting side is transmitted, by a transmitter, to a receiver, over an AC-coupled wired link, to be processed and possibly reproduced on the receiving side.

The method 600 may include performing coarse detection of synchronization pulses included in the video signal, e.g. coarse detection of one or more horizontal sync pulses and/or vertical sync pulse, in order to recover the timing information represented by the synchronization pulses. Such detection is referred to as "coarse" because it is performed despite the movement of these pulses due to the SAG effect of the AC-coupled transmission line, and in the presence of other potential interferers, and because it prepares the received signal for a subsequent, more refined, synchronization (or timing) information extraction step. The method 600 may include several processing steps that are performed on the received signal to accurately extract the timing signal, as outlined below. As shown in FIG. 6, the steps may include a low-pass filtering step 604, a SAG reduction filtering step 606, a coarse clamping step 608, a synchronization slicing step 610, and a sampling window generation step 612. In some embodiments, a non-transitory computer-readable medium may be configured with specialized instructions which, when executed on a hardware processor, e.g., the processor 825 shown in FIG. 8, instruct/enable a receiver logic module, e.g., the receiver logic 826 shown in FIG. 8, to carry out (some or all of) the steps of the methods disclosed herein. The receiver logic 826 may be, for example, a digital signal processing (DSP) module, a microprocessor, or any other suitable module.

In some embodiments, the coarse sync detection of the method 600 may begin with the step 604 which includes applying a low-pass filter to the input signal, e.g., the uncorrected RX signal 501, to reveal synchronization pulses within the input signal. The LPF may be a suitable first measure to extracting timing information since the synchronization pulses have a very strong low-frequency component. Therefore, applying low-pass filtering to the input signal prior to extracting the timing information may be advantageous as it may significantly reduce the influence of higher-frequency signals and interferers on the extracted timing information. In some embodiments, the LPF of the step 604 may be implemented as a passive low-pass filter.

In some embodiments, the method 600 may proceed with a step 606, in which a filter referred to herein as a "SAG reduction filter" may be applied to the input signal, e.g. to the output of the LPF step 604. The SAG reduction filter is configured to find the sagged pulses and amplify as needed in order to offset the SAG effect imparted by the transmission channel and recover the original as much as possible. In some embodiments, the SAG reduction filter may include applying a fixed, low-frequency boost to the output of the LPF step 602, with a time constant set to match the approximate SAG of the transmission channel, so that the SAG effect is counteracted as much and as closely as possible. The time constant may be derived from the channel approximation and may be used to determine which frequency components of the signal are amplified to compensate for the low-frequency signal amplitude reduction from the AC-coupled link. In some embodiments, such a transfer function may be substantially constant and, therefore, no feedback loop is implemented as part of application of the SAG reduction filter in step 606. This may be advantageous because it may simplify locating the timing signals in the low-pass filtered output. Alternatively, instead of using separate LPF and SAG reduction steps (i.e., steps 604 and 606), the step 604 may be omitted and the step 606 may implement the SAG reduction filter as a LPF, thus combining the low-pass filtering and boosting functions. This may advantageously reduce the movement of the video signal, e.g., shifting with respect to the original timeline, which may simplify finding the synchronization signals in the following steps.

The method 600 may then proceed with a step 608, in which the minimum level of the filtered output (which should be the bottom of the synchronization pulse(s), also referred to as the sync-tip(s)) is clamped (i.e., adjusted) to a certain known level (known to the receiver 820, e.g., programmed in the receiver 820 or provided to the receiver 820), which further improves the positioning of the synchronization pulse before slicing it for timing extraction. Thus, after the SAG reduction filter has been applied, the minimum level of the signal at the output of the SAG reduction filter of step 606 is clamped to a known level in step 608. In some embodiments, the minimum level may be selected or 'set' by the type of signal (e.g., a video signal will typically not exhibit a level lower or greater than a certain value), and can be adapted based on the application and/or requirements. The clamping of the step 608 may advantageously help locating the sync pulses by reducing false detection of sync tips. Due to the SAG effect, some parts of the signal, which were not originally part of the synchronization pulse, may have acquired a magnitude and positioning that may confuse the receiver into believing that those parts were part of the synchronization pulse. Clamping of the step 608 may help address this potentially compounding error by enforcing a minimum amplitude on the sync tips and removing parts of the sync signal that do not conform to the predefined range. This may yield a cleaner timing signal or information. In some embodiments, the clamp implemented in the step 608 is preferably a digital clamp.

Next, the method 600 may proceed with a step 610, in which a circuit (which may be of the type patented in U.S. Pat. No. 7,327,399, incorporated herein by reference in its entirety) may be used to recover the timing information from the filtered and clamped synchronization signal produced as the output of the clamp of the step 608. Advantageously, with this information the receiver can accurately recover the lines of video that are positioned between each synchronization pulse, and correctly position the received pixels on the output video line.

Because the synchronization pulses happen at a predetermined frequency (that is, the frequency defined by the length or duration of the pixel lines), one a single synchronization pulse is identified, the position of the next pulse can be accurately predicted based on that frequency (e.g., from the history of the previous pulses). Therefore, the method 600 may also include a step 612, in which a sampling window is applied to the output of the synchronization slicing 610. Sampling window generation may advantageous allow the receiver to further pinpoint the location of the synchronization pulse and thereby ignore interference which could disturb the timing recovery.

Once one or more of the steps of the method 600 have been taken, the receiver has recovered horizontal timing and vertical timing. Horizontal timing refers to the relationship between the signal amplitude or the start of a single or one-pixel line, while vertical timing refers to the start of a frame (each frame being composed of a plurality or stack of horizontal pixel lines sharing a common vertical start of frame point). Further processing may be required to detect the vertical synchronization pulse (i.e., the vertical timing). The receiver can then use the timing information 511 in the block 504, shown in FIG. 5, to extract the known content from the received signal 503. In some embodiments, the receiver may also be configured to use the extracted timing information 511 to render/decode the video information as provided in the corrected RX signal 503.

AC-Coupled Channel Model and Transfer Function of the SAG Correction Filter

Figure 7:
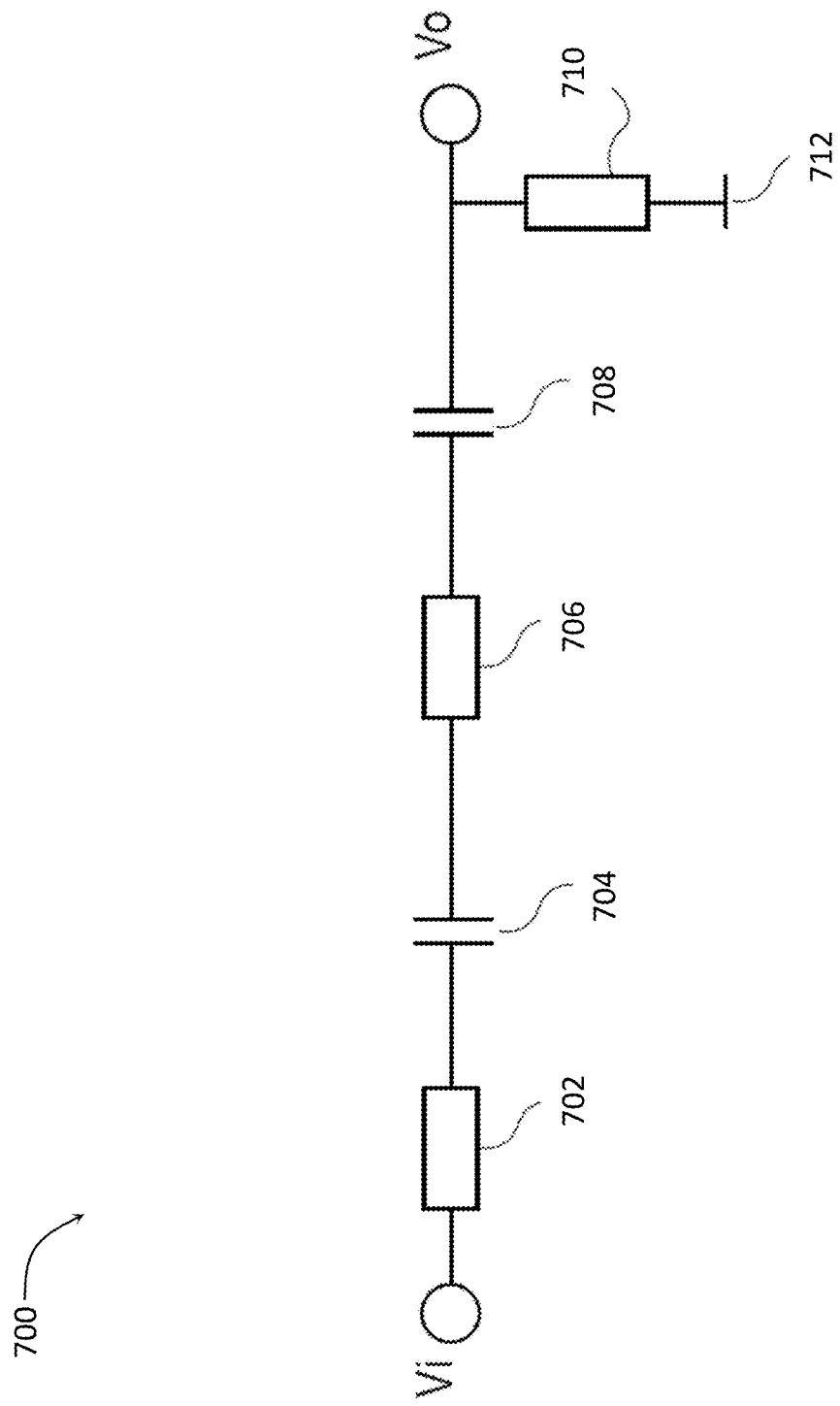
FIG. 7 shows a schematic example of a single-ended transmission channel with its modelling parameters in accordance with some embodiments of the present disclosure.

As mentioned above, the SAG correction filter 502 is designed based on the transfer function of the path that the video signal has to traverse, e.g. the path of the AC-coupled link 830. As an example, a single-ended representation of the transmission channel (i.e., the AC-coupled link 830) as shown in FIG. 7 may be considered. FIG. 7 illustrates an input signal Vi (i.e., a video signal to be transmitted by the transmitter 810 over the AC-coupled link 830), an output signal Vo (i.e., a video signal received by the receiver 820 over the AC-coupled link 830, before any corrections have been applied, i.e., the uncorrected RX signal 501 shown in FIG. 5), and a transmission channel (i.e., the AC-coupled link 830) characterized by a number of transmission channel parameters. Namely, as shown in FIG. 7, these parameters may include one or more of a transmitter-side resistance 702 ($R_{tx}$), a transmitter-side coupling capacitor 704 ($C_{tx}$), a transmission cable resistance 706 ($R_{cable}$), a receiver-side coupling capacitor 708 ($C_{rx}$), and a receiver-side resistance 710 ($R_{rx}$). The elements 702, 704, 708, and 710 shown in FIG. 7 are analogous to, respectively, elements 104, 106a, 106b, and 112 shown in FIG. 1, the description of which elements is therefore, not repeated for FIG. 7 in the interests of brevity.

The transfer function of a transmission channel with parameters as shown in FIG. 7 can be modeled as:

$$\frac{V_o(s)}{V_i(s)} = \frac{R_{rx}}{R_{tx} + \frac{1}{sC_{tx}} + R_{cable} + \frac{1}{sC_{rx}} + R_{rx}} = \frac{sR_{rx}\frac{C_{tx}C_{rx}}{C_{tx}+C_{rx}}}{1 + s(R_{tx} + R_{cable} + R_{rx})\frac{C_{tx}C_{rx}}{C_{tx}+C_{rx}}}, \quad (1)$$

where $C_{tx}$ represents the total transmitter capacitance seen by the transmission line, $C_{rx}$ represents the total receiver capacitance seen by the transmission line, $R_{tx}$ represents the total transmitter resistance seen by the transmission line, $R_{rx}$ represents the total receiver resistance seen by the transmission line, and $R_{cable}$ represents the resistance of the transmission wire(s). The value of $R_{cable}$ can be obtained from the cable specifications and may depend on the length of the cable and can be approximately 15 meters in an automotive surround view application. The values of $C_{tx}$, $C_{rx}$, $R_{tx}$, and $R_{rx}$ can be obtained from the component values in the transmitter and receiver design. The series combination of the capacitors and the series combination of the resistors can be substituted by simple mathematical addition, as follows:

$$C_T = \frac{C_{tx}C_{rx}}{C_{tx} + C_{rx}} \quad (2)$$

$$R_T = R_{tx} + R_{cable} + R_{rx} \quad (3)$$

where $R_T$ is the total resistance and $C_T$ is the total capacitance. This substitution yields the transfer function as follows:

$$\frac{V_o(s)}{V_i(s)} = \frac{sR_{rx}C_T}{1 + sR_TC_T} \quad (4)$$

Next, to model the effect of this transfer function in the digital domain, a bilinear transformation may be performed on the analog transfer function, which would yield the corresponding digital response in relation to frequency. Applying a bilinear transform to the transfer function according to (4) with a clock frequency of $F_{clk}$ yields the following expression for the digital model (i.e., the transfer function in the digital domain):

$$\frac{V_o(z)}{V_i(z)} = \frac{2C_T F_{clk} R_{rx} - 2C_T F_{clk} R_{rx} z^{-1}}{(2C_T F_{clk} R_T + 1) + (1 - 2C_T F_{clk} R_T)z^{-1}} \quad (5)$$

Defining the gain of the transmission channel, G, as $$G = \frac{R_{rx}}{R_T},$$

the transfer function can then be simplified to:

$$\frac{V_o(z)}{V_i(z)} = G \frac{1 - z^{-1}}{\left(1 + \frac{1}{2C_T F_{clk} R_T}\right) + \left(\frac{1}{2C_T F_{clk} R_T} - 1\right)z^{-1}} \quad (6)$$

Thus, the transfer function of the AC-coupled link 830 may be seen as the gain of the channel shaped by the leakage path formed by the total series capacitance and the total series resistance. To simplify the equation (6), parameter α may be defined as:

$$\alpha = \frac{1}{2C_T F_{clk} R_T} \quad (7)$$

The transfer function may then be expressed as:

$$\frac{V_o(z)}{V_i(z)} = G \frac{1 - z^{-1}}{(1 + \alpha) + (\alpha - 1)z^{-1}} \quad (8)$$

As described above, to compensate/correct for the effect of the transmission over the AC-coupled transmission channel with the transfer function according to equation (8), the SAG correction filter 502 is configured to perform filtering with an opposite/inverted transfer function. Namely, the inversion of the transfer function according to the equation (8) yields a transfer function $$H(z) = \frac{1}{G} \cdot \frac{(1 + \alpha) + (\alpha - 1)z^{-1}}{1 - z^{-1}} \quad (9)$$

where the gain correction factor, 1/G, can, for example be based on a measurement of the synchronization pulse depth or any other known indication of signal amplitude (including, possibly, the same known signal used to measure the response of the adaptive filter), to achieve the desired video amplitude for the received signal. By performing an inverse z-transform on equation (9), a description of an infinite impulse response (IIR) filter with two taps may be obtained:

$$v_x(n) = v_x(n-1) + v_o(n) - v_o(n-1) + \alpha(v_o(n) + v_o(n-1)), \quad (10)$$

where $v_x(n)$ describes the corrected output (e.g., the corrected RX signal 503 shown in FIG. 5).

The component or factor $\alpha(v_o(n) + v_o(n-1))$ in the equation (10) may be referred to as the droop correction factor.

It is noted herein that while the example above describes a filter with two taps, any number of taps as deemed suitable or necessary may be used to implement the SAG correction filter 502.

Due to the fractional nature of the α parameter, in some embodiments, a digital implementation of the SAG correction filter 502 may be configured to perform one fractional multiplication and one fractional accumulation on each iteration.

The matching of the SAG correction filter 502 to the actual transmission channel is important and is dependent on the actual value of α, where the α parameter is defined according to the equation (7) above.

Application of the SAG correction filter 502 may advantageously result in a corrected video signal 503 which has its sagged DC level portions substantially restored to their constant levels. Ideally, the amplitude of the sagged horizontal synchronization pulses will be restored to a nominal DC level.

Digital vs Analog Implementation of the SAG Correction Filter

In some embodiments, the SAG correction filter 502 may be implemented in a digital form, i.e., it may work with digital signals, in which case, prior to applying the SAG correction filter 502 and the rest of the adaptive filtering operations shown in FIG. 5, the video signal received by the receiver 820 over the AC-coupled link 830 needs to be digitized. To that end, in some embodiments, the received video signal may be sampled at a suitable sampling rate by a sample-and-hold circuit or module, and digitized at a suitable resolution (e.g., by the ADC 824 shown in FIG. 8), to create a discrete-time signal. In some embodiments, the digital samples may be processed and filtered in real-time as they are received by the receiver 820. In other embodiments, the digital samples may be stored temporarily prior to filtering of the method 500. Alternatively, the adaptive filtering of the method 500 may be applied to a previously generated video data (or other type of data) that has been previously recorded/stored.

Alternatively, the SAG correction filter 502 may be implemented in an analog form, i.e., as a suitable circuit, as opposed to digital form, in which case the SAG correction filter 502 can be respectively applied to the continuous-time analog video signal received over the AC-coupled link. In an analog implementation, the transmission channel output (i.e., the video signal received at the receiver 820) may be passed through an analog version of the SAG compensation filter 502, configured to counteract the effects of the transmission channel modelled by the transmission channel model as described above. In various embodiments, the SAG correction filter 502 implemented in the analog form may include a passive RC filter including one or more capacitors and one or more resistors, or may include an active filter. An analog implementation of the SAG compensation filter 502 may be advantageous over digital filter in some implementations because it can be less costly and because it doesn't require sampling or anti-aliasing to be performed on the transmission channel output signal. Further, an analog filter may be faster than its digital counterpart as digital filters may exhibit latency issues (i.e. a difference in time between the input and the response) due to the associated analog-to-digital conversion and anti-aliasing filters.

Measure Reference Levels and Clamp

Despite the correction provided by the SAG correction filter 502 as described above (whether analog or digital), the reference level of each DC level line could still vary to a certain extent due to a potential residue SAG effect. Thus, in some embodiments, the receiver may also be configured to measure the displacement or movement that may be present in the known content across the lines (filtering to reduce the effect of noise and interference on this measurement) and may add a corrective DC offset on a per-line basis and clamp this reference level to a preferred output level or range.

Example Video System

Figure 8:
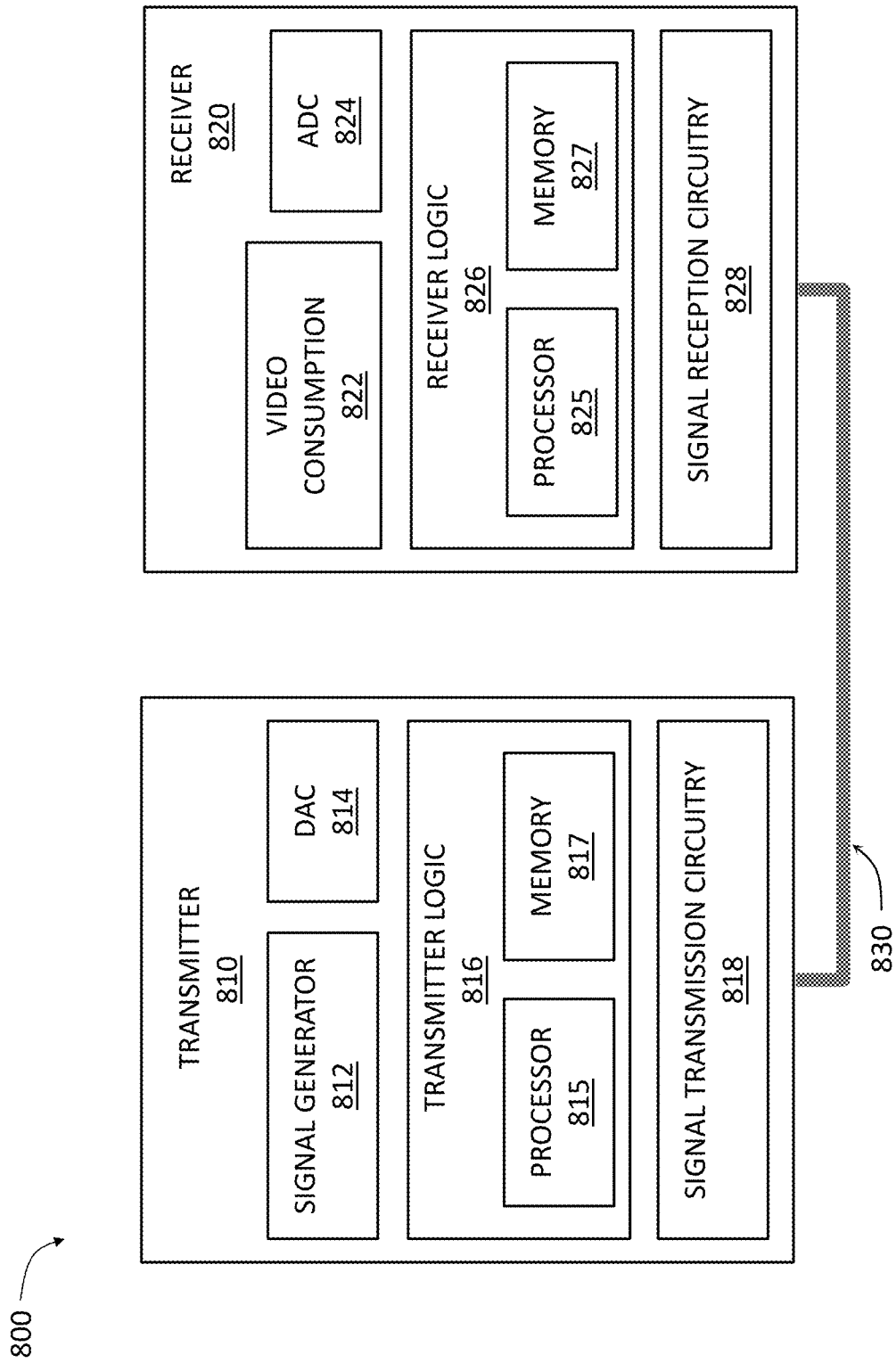
FIG. 8 provides a block diagram illustrating an example video system in accordance with some embodiments of the present disclosure.

FIG. 8 illustrates an example video system 800, according to some embodiments of the present disclosure. The video system 800 may be configured to implement various aspects of SAG effect compensation using adaptive filtering and/or known content inserted into video signals in accordance with various embodiments of the present disclosure.

As shown in FIG. 8, the example system 800 may include a transmitter 810 and a receiver 820 coupled by an AC-coupled link 830. The AC-coupled link 830 may be any suitable wired conductor cable, e.g., the single-ended conductor cable 108 or the differential-pair cable 208, described above.

As shown in FIG. 8, the transmitter 810 may include, or be communicatively coupled to, a video signal generator 812. The video signal generator 812 may include any suitable means for generating a signal to be transmitted to the receiver 820 over the AC-coupled link 830. For example, in some embodiments, the video signal generator 812 may include any suitable image sensor, image system processor or camera (which may include a plurality of cameras) configured to acquire a video signal (which may include a plurality of video signals). In other embodiments, the signal generator 812 may include means for producing a computer-generated video signal.

As further shown in FIG. 8, the transmitter 810 may also include, or be communicatively coupled to, one or more digital-to-analog converters (DACs) 814. As used herein, the term "DAC" refers to an electronic circuit/device that converts a digital value that represents an amplitude of a continuous physical quantity to a corresponding analog value. In some embodiments, the one or more DACs 814 may be configured to receive a digital signal generated by the signal generator 812, e.g., to receive a digital video signal comprising digital pixel values as acquired by the camera, and convert the digital values (i.e., discrete-time and discrete-amplitude values of the digital signal) to a continuous-time and continuous-amplitude analog signal. In some embodiments, the one or more DACs 814 may be configured to receive a processed version of the digital signal generated by the signal generator 812, e.g., as processed by the transmitter logic 816 to include known content as described herein, and to convert that signal to analog domain for AC-coupled transmission to the receiver over the AC-coupled link 830.

In some embodiments, besides the one or more DACs 814, the transmitter 810 may include one or more analog-to-digital converters (ADCs) (not specifically shown in FIG. 8). As used herein, the term "ADC" refers to an electronic circuit/device that converts a continuous physical quantity carried by an analog signal to a digital number that represents the quantity's amplitude (or to a digital signal carrying that digital number). The result is a sequence of digital values (i.e., a digital signal) that has converted a continuous-time and continuous-amplitude analog input signal to a discrete-time and discrete-amplitude digital signal. Various converters included in the transmitter 810 may operate by being provided with clock signals generated by a clock generator (not specifically shown in FIG. 8), e.g., under the control of the processor 815.

As also shown in FIG. 8, the transmitter 810 may further include, or be communicatively coupled to, transmitter logic 816. The transmitter logic 816 may be implemented in hardware, software, firmware, or any suitable combination of the one or more of these, and may be configured to control the operation of the transmitter 810 as described herein. To that end, the transmitter logic 816 may make use of at least one processor 815 and at least one memory element 817 along with any other suitable hardware and/or software to enable its intended functionality of using known content (in particular, making sure that known content is included in the video signal to be transmitted over the AC-coupled link 830) for SAG effect compensation on a signal transmitted over the AC-coupled link 830, as described herein. In some embodiments, the processor 815 can execute software or an algorithm to perform the activities as discussed in the present disclosure, e.g., the processor 815 can execute the algorithms that control digital-to-analog conversion of signals generated by the signal generator 812 for transmission over the analog transmission link 830. Furthermore, the processor 815 can execute algorithms that control generation and inclusion of known content in a video signal to be transmitted to the receiver 820 as described herein. Further descriptions of the processor 815 and the memory element 817 are provided below.

Also shown in FIG. 8 is that the transmitter 810 may also include, or be communicatively coupled to, signal transmission circuitry 818 for transmitting signals to the receiver 820. In particular, the signal transmission circuitry 818 may include components for enabling AC-coupled transmission of the analog video signal, e.g., as obtained from the DAC 814 and processed by the transmitter logic 816. In some embodiments, such components may include coupling capacitors, e.g., coupling capacitors on the transmitter side as described with reference to FIGS. 1 and 2, as well as any other circuitry as known in the art to be used for AC-coupled analog transmission of signals.

Turning to the receiving side of the video system 800, as shown in FIG. 8, the receiver 820 may include, or be communicatively coupled to, signal reception circuitry 828, receiver logic 826, an analog-to-digital converter (ADC) 824, and, optionally, a video consumption device 822. The video consumption device 822, may, in some embodiments, be a video processing device such as an image system processor, a video analysis device, such as an ADAS processor, or a video rendering device such as a display.

The signal reception circuitry 828 may be configured to receive signals from the transmitter 810. In particular, the signal reception circuitry 828 may include components for enabling receipt of AC-coupled transmission of the analog video signal, e.g., to be provided to the ADC 824 for conversion to digital and to be provided to the receiver logic 826 for further processing, possibly after conversion by the ADC 824. In some embodiments, such components may include coupling capacitors, e.g., coupling capacitors on the receiver side as described with reference to FIGS. 1 and 2, as well as any other circuitry as known in the art to be used for reception of AC-coupled analog signals.

As shown in FIG. 8, the receiver 820 may also include one or more ADCs 824. In case of the ADC 824 used in the video system 800, the analog input signal being converted may be the video signal transmitted from the transmitter 810 over the AC-coupled video link 830 and received by the signal reception circuitry 828, e.g., to be further processed in digital form by the receiver logic 826. In some embodiments, the receiver 820 may further include one or more DACs (not specifically shown in FIG. 8). Various converters included in the receiver 820 may operate by being provided with clock signals generated by a clock generator (not specifically shown in FIG. 8), e.g., under the control of the processor 825.

Similar to the transmitter logic 816, the receiver logic 826 may be implemented in hardware, software, firmware, or any suitable combination of the one or more of these, and may be configured to control the operation of the receiver 820, as described herein. To that end, the receiver logic 826 may make use of at least one processor 825 and at least one memory element 827 along with any other suitable hardware and/or software to enable its intended functionality of using known content (in particular, extracting known content from the received video signal, comparing the extracted known content to the expected known content, and adapting the value of the transmission parameter) to perform the SAG effect compensation on the video signal received from the transmitter over the AC-coupled link 830, as described herein. In some embodiments, the processor 825 can execute software or an algorithm to perform the activities as discussed in the present disclosure, e.g., the processor 825 can execute the algorithms that control analog-to-digital conversion of signals received by the signal reception circuitry 828 after having been transmitted over the analog transmission link 830, execute algorithms. Furthermore, the processor 825 can execute algorithms implementing adaptive filtering and use of the known content to improve the SAG effect compensation, as described herein. Further descriptions of the processor 825 and the memory element 827 are provided below.

Each of the processors 815, 825 may be configured to communicatively couple to other system elements via one or more interconnects or buses. Such a processor may include any combination of hardware, software, or firmware providing programmable logic, including by way of non-limiting example a microprocessor, a digital signal processor (DSP), a field-programmable gate array (FPGA), a programmable logic array (PLA), an application specific IC (ASIC), or a virtual machine processor. The processor 815 may be communicatively coupled to the memory element 817, while the processor 825 may be communicatively coupled to the memory element 827, for example in a direct-memory access (DMA) configuration. Each of the memory elements 817, 827 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory items discussed herein should be construed as being encompassed within the broad term "memory element."

The information being tracked or sent to the one or more components/elements of the transmitter 810 and of the receiver 820 (e.g., information indicative of the expected known content, information indicative of known content to be included in a video signal to be transmitted, or any other information described herein) could be provided and/or stored in any database, register, control list, cache, or storage structure, all of which can be referenced at any suitable timeframe. Any such storage options may be included within the broad term "memory element" as used herein and may be used to implement the memory element 817 and/or memory element 827. Similarly, any of the potential processing elements, modules, and machines described herein should be construed as being encompassed within the broad term "processor" as used herein and may be used to implement the processor 815 and/or the processor 825. Each of the elements shown in FIG. 8, e.g., the signal generator 812, the DAC 814, the transmitter logic 816, the video consumption 822, the ADC 824, or the receiver logic 826, can also include suitable interfaces for receiving, transmitting, and/or otherwise communicating data or information in a network environment, either over wired or a wireless communications link.

In certain example implementations, mechanisms for SAG effect compensation using adaptive filtering and/or using known content inserted into video signals as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g., the memory elements 817 and 827 shown in FIG. 8, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g., the processors 815 and 825 shown in FIG. 8, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

Example Data Processing System

FIG. 9 provides a block diagram illustrating an example data processing system for implementing at least portion of methods for SAG effect compensation using adaptive filtering and/or known content inserted into video signals as disclosed herein, according to some embodiments of the present disclosure. Such a data processing system could be configured to, e.g., function as the transmitter logic 816 and/or as the receiver logic 826 described herein or as any other system configured to implement various improved mechanisms related to performing SAG effect correction using adaptive filtering and/or known content inserted into video signals, as disclosed herein.

As shown in FIG. 9, the data processing system 900 may include at least one processor 902 coupled to memory elements 904 through a system bus 906. As such, the data processing system may store program code within memory elements 904. Further, the processor 902 may execute the program code accessed from the memory elements 904 via a system bus 906. In one aspect, the data processing system may be implemented as a computer that is suitable for storing and/or executing program code. It should be appreciated, however, that the data processing system 900 may be implemented in the form of any system including a processor and a memory that is capable of performing the functions described within the present disclosure.

In some embodiments, the processor 902 may be the processor 815 and the memory elements 904 may be the memory elements 817 of the transmitter 810 of the video system 800 shown in FIG. 8, as described above. In some embodiments, the processor 902 may be the processor 825 and the memory elements 904 may be the memory elements 827 of the receiver 820 of the video system 800 shown in FIG. 8, as described above.

The memory elements 904 may include one or more physical memory devices such as, for example, local memory 908 and one or more bulk storage devices 910. The local memory may refer to RAM or other non-persistent memory device(s) generally used during actual execution of the program code. A bulk storage device may be implemented as a hard drive or other persistent data storage device. The processing system 900 may also include one or more cache memories (not shown) that provide temporary storage of at least some program code in order to reduce the number of times program code must be retrieved from the bulk storage device 910 during execution.

Input/output (I/O) devices depicted as an input device 912 and an output device 914, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 912 and the output device 914). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

When used in a video system according to various embodiments of the present disclosure, e.g. in the video system 800 shown in FIG. 8, the input device 912 may be used to receive input, e.g., as provided by a user, and to configure the video system 800 in accordance with the user input. For example, the input received by the input device 912 may specify one or more of the following: the type of known content to be used by the transmitter 810 and the receiver 820, the position where the known content is to be included in the video signal to be transmitted, the frequency of inclusion of the known content in the video signal, the frequency with which the receiver 820 is to perform adaptations of the transmission parameter, etc. The transmitter 810 and the receiver 820 of the video system 800 may then be configured in accordance with the input received by the input device 912.

A network adapter 916 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 900, and a data transmitter for transmitting data from the data processing system 900 to said systems, devices and/or networks. Modems, cable modems, and Ethernet cards are examples of different types of network adapter that may be used with the data processing system 900.

When used in a video system according to various embodiments of the present disclosure, e.g. in the video system 800 shown in FIG. 8, the network adapter 916 may be used to receive input from other systems, computer systems, remote network devices, and/or remote storage devices through intervening private or public networks, and to configure the video system 800 in accordance with the received input. For example, the network adapter 916 may be configured to receive examples of input as described with reference to the input received by the input device 912 from the user, except that now it would be received from other systems, computer systems, remote network devices, and/or remote storage devices through intervening private or public networks. The transmitter 810 and the receiver 820 of the video system 800 may then be configured in accordance with the input received by the network adapter 916.

As pictured in FIG. 9, the memory elements 904 may store an application 918. In various embodiments, the application 918 may be stored in the local memory 908, the one or more bulk storage devices 910, or apart from the local memory and the bulk storage devices. It should be appreciated that the data processing system 900 may further execute an operating system (not shown in FIG. 9) that can facilitate execution of the application 918. The application 918, being implemented in the form of executable program code, can be executed by the data processing system 900, e.g., by the processor 902. Responsive to executing the application, the data processing system 900 may be configured to perform one or more operations or method steps described herein.

Select Examples

In this disclosure, techniques are proposed to compensate for the SAG effect produced in AC-coupled transmission channels. Each technique or combination of techniques may achieve one of at least reduction, elimination, and compensation of the SAG effect, and hence enable the acceptable transmission of video information over AC-coupled transmission channels. Further, some embodiments of the present disclosure may have the benefit of enabling use of very small coupling capacitor(s), e.g., capacitors on the order of approximately 100 times smaller than the conventional coupling capacitor(s), e.g. coupling capacitors with capacitance less than 1 uF to implement AC-coupled transmission as described herein.

Example A1 provides a method that includes steps of: filtering by a SAG correction filter at least part of an analog input signal which was previously at least partly transmitted via an AC-coupled transmission line; and outputting a corrected output signal; wherein the AC-coupled transmission line is a transmission line which is coupled to a transmitter via at least one coupling capacitor and coupled to a receiver via at least one coupling capacitor.

As used herein, the term 'part of an analog signal' may refer herein to a temporal duration or extension of the analog signal.

Example A2 provides a method that includes the steps of: receiving by a receiver at least a part of an analog input signal from an AC-coupled transmission line; filtering by a SAG correction filter at least part of an analog input signal which was previously at least partly transmitted via an AC-coupled transmission line; and outputting a corrected output signal, wherein the AC-coupled transmission line is a transmission line which is coupled between a transmitter and a receiver via at least one coupling capacitor.

Example A3 provides the method according to example A2, which can optionally further include the step of digitizing said part of the analog signal with an analog-to-digital converter (ADC) prior to applying the SAG correction filter, and where the SAG correction filter is a digital filter.

Example A4 provides the method according to examples A2 or A3, which can optionally further include the step of applying an anti-aliasing filter prior to digitizing the at least one part of the analog signal.

Example A5 provides the method according to any of examples A1-A3, which can optionally further include the step of sampling said at least one part of the analog signal with a SHA (sample-and-hold) circuit prior to digitizing at least a part of the analog signal with the ADC.

Example A6 provides that at least one part of the analog signal of any of previous examples may optionally be included in one or more instances of known contents encoded or inserted therein.

Example A7 provides that SAG correction filter of any of the previous examples is an analog filter, such as a programmable filter including one or more switched capacitors, or a programmable IIR or a finite impulse response (FIR) filter.

Example A8 provides that digital SAG correction filter includes an IIR filter having two or more taps and coefficients defined as $$v_x(n)=v_x(n-1)+v_o(n)-v_o(n-1)+\alpha(v_o(n)+v_o(n-1)),$$

where n is a sample of the sampled or digitized signal, $v_o$ is this and $v_x$ is the output signal, and the parameter is defined as $$\alpha = \frac{1}{2C_T F_{clk} R_T},$$

where $C_T$ represents the total series transmission line capacitance (and may be an approximate or estimated value), where $R_T$ represents the total series transmission line resistance (and may be an approximate or estimated value), and where $F_{clk}$ represents the clock frequency.

Example A9 provides that any of the previous examples optionally include the step of monitoring a correction level and updating α as needed.

Example A10 provides that filter is applied in real-time as the signal/samples are received or digitized.

Example A11 provides that herein the samples are stored temporarily prior to filtering by the SAG correction filter.

Example A12 provides that the SAG compensation system of example A1, can optionally be configured to adapt the filter parameters based on a monitoring scheme and feedback loop mechanism.

Example A13 provides a method that includes the steps of encoding by an encoder of a digital signal and formatting the digital signal into an analog signal, and optionally includes known content encoded at a predefined periodicity.

Example A14 provides that digital signal is a video data signal, and it is converted into an analog signal prior to transmission over the AC-coupled transmission line.

Example A15 provides that video signal format is a time-multiplexed sequence comprising a control data slot, followed by a synchronization data slot, a Y data slot (luminance), and U data slot, and a V data slot.

Example A16 provides that the format of example A15 is a time-multiplexed sequence consisting of a control data slot for a control data signal, followed by a R data slot for an R signal, followed by a G data slot, followed by a B data slot, followed by a synchronization data slot.

Example A17 provides that the SAG correction filter is provided as part of a digital equalizer block, a DSP block, or other suitable modules or blocks.

Example A18 provides a system that includes a transmitter and a receiver mutually connected via a transmission line comprising at least one coupling capacitor, Example A19 provides that in the system of example A18 the transmitter is configured to insert one or more instances of known content into a digital signal digitization and to output analog signal via the AC-coupled transmission line, and the receiver is configured to locate or decode the at least one instance of known content, and is further configured to compare a value of the known content, and to adapt a SAG correction filter parameter alpha as needed.

Example A20 provides that transmitter and receiver of the system of example A18 are connected via a single conducting element, which may include a wire, thereby forming a single-ended signaling scheme.

Example A21 provides that transmitter and receiver of the system of example A18 via are connected at least two conducting elements, such as a UTP, STP or a coaxial cable, thereby forming a differential-pair signaling scheme.

Example A22 provides that SAG compensation system according to any of the preceding examples, e.g., examples A1 or A2, can optionally include the step of: monitoring scheme may comprise inserting reference video pixel lines into a video information signal to be transmitted, wherein the receiver is configured to locate the inserted reference video pixel lines in the received video information signal, and/or wherein a transmitter is configured to insert or embed one or more instances of known content into the video information signal, and is further configured to adapt the filter processing parameters based on the located (previously inserted) reference video pixel lines.

Example A23 provides that any of the preceding examples, e.g., examples A1-A3, can optionally be an analog filter, and the analog filter may include at least one or more resistances defining a total resistance value, one or more capacitors defining a total capacitance value, and optionally may further comprise at least one feedback element such as an operational amplifier, wherein the resistors are connected to the capacitor and to an input of the op-amp (i.e., operational amplifier) and the op-amp has one regular input and one rectifying input and there is at least one capacitor in a feedback loop connected from output of op-amp to one of the inputs of the op-amps.

Example A24 provides that output signal of the analog filter of example A23 is optionally converted to a digital signal after filtering by the analog filter.

Example A25 provides a SAG effect compensation method, the method including modeling a transmission channel via circuit analysis; selecting a filter type/composition and filter parameters to counter the transfer function of the transmission line to correct a sagging effect; and applying the filter to the received signal thereby producing an output that is at least partially SAG-corrected.

Example A26 provides an AC-coupled transmission line between a transmitter and a receiver, with one or more coupling capacitors having a total capacitance of 9.4 µF (microfarads) or less, wherein each capacitor has a capacitance of 4.7 µF or less.

Example A27 provides that AC-coupled transmission line according to any one of the preceding examples can optionally be a differential-pair transmission line.

Example A28 provides that receiver module decodes known content in a signal received via an AC-coupled transmission line.

Example A29 provides that example A28 can optionally include the step of adjusting a parameter α of an adaptive SAG correction filter based on decoding of said known content.

Example A30 provides that transmission line according to any one of the preceding examples is an automotive camera link.

Example A31 provides that transmission line according to any one of the preceding examples is an automotive video link.

Example A32 is an apparatus including means for implementing and/or carrying out any one of the methods described herein.

Example A33 provides that receiver receives a signal via an AC-coupled transmission line signal to which lines have been inserted, filtering it with the SAG correction filter, receive and retrieve inserted lines, and feed that back to compare with the level that should have been received.

Example A34 provides that known content may include one or more rectangular (contiguous or separate) pulses.

Example B1 provides a method for processing a video signal received over an alternating current (AC)-coupled channel, the method including: applying a filter (the SAG correction filter described herein) to the received (i.e., uncorrected) video signal to generate a corrected video signal, where a transfer function of the filter is dependent on a transmission parameter, referred to herein as an a parameter, and where the transmission parameter is based on a plurality of parameters of the AC-coupled channel; extracting predefined/known content from the corrected video signal; adjusting the transmission parameter based on a comparison of the extracted predefined/known content with expected predefined/known content; and; and using the filter with the adjusted transmission parameter for subsequent applications of the filter either to said video signal based on which the transmission parameter was adjusted, a portion of said video signal, or a different video signal (or a different portion of said video signal). The method may further include rendering the video signal following application of the filter with the transfer function based on (i.e., using) the adjusted transmission parameter.

Example B2 provides the method according to example B1, where steps of applying the filter, extracting the predefined content, and adjusting the transmission parameters are performed iteratively. In this manner, filter transfer function may be updated based on the actual values of the plurality of parameters of the AC-coupled channel, which values may vary from the designed values in view of process, supply voltage, and/or temperature variations.

Example B3 provides the method according to examples B1 or B2, where the transmission parameter is adjusted as to reduce or minimize a difference between the extracted predefined content and the expected predefined content.

Example B4 provides the method according to any one of the preceding examples B, where the plurality of parameters of the AC-coupled channel includes one or more parameters indicative of a capacitance of the AC-coupled channel and one or more parameters indicative of a resistance of the AC-coupled channel.

Example B5 provides the method according to example B4, where the plurality of parameters of the AC-coupled channel further includes a clock frequency ($F_{clk}$) of the filter (i.e., of the SAG correction filter 502).

Example B6 provides the method according to any one of examples B1-B5, where the predefined content includes one or more pulses of one or more predefined amplitudes.

Example B7 provides the method according to example B6, where the one or more pulses include one or more horizontal synchronization pulses and/or one or more vertical synchronization pulses of the video signal. In other examples, the one or more pulses of the predefined content may be pulses other than the horizontal or vertical sync pulses, i.e., test pulses deliberately added to the video signal to be transmitted over the AC-coupled transmission channel.

Example B8 provides the method according to any one of examples B1-B5, where the predefined content includes one or more test lines inserted into the video signal prior to transmitting the video signal over the AC-coupled transmission channel.

Example B9 provides the method according to example B8, where the one or more test lines include one or more test lines of a constant, predefined amplitude.

Example B10 provides the method according to example B8, where the one or more test lines include alternating test lines of different amplitudes. For example, in some embodiments, the test lines may be alternating lines of (relatively) high and (relatively) low amplitude levels.

Example B11 provides the method according to any one of the preceding examples B, further including generating timing information from the received (i.e., uncorrected) video signal; and using the generated timing information in extracting the predefined/known content.

Example B12 provides the method according to example B11, where generating timing information includes applying a low-pass filter to the received (i.e., uncorrected) video signal to generate a low-pass filtered video signal, applying a SAG reduction filter to the low-pass filtered video signal to generate a SAG reduced low-pass filtered video signal, applying coarse clamping to the SAG reduced low-pass filtered video signal to generate a clamped video signal, and generating the timing information based on the clamped video signal.

Example B13 provides the method according to example B12, where generating the timing information based on the clamped video signal includes performing synchronization slicing on the clamped video signal to generate a sliced signal and generating the timing information based on a sampling window of the sliced signal.

Example B14 provides the method according to any one of the preceding examples B, where adjusting the transmission parameter based on the comparison of the extracted predefined/known content with expected predefined/known content includes increasing or decreasing a value of the transmission parameter based on a difference between an amplitude of at least one component of the extracted predefined/known content and an amplitude of at least one component of the expected predefined/known content.

Example B15 provides the method according to any one of the preceding examples B, where the filter is a z-domain filter, and the transfer function of the filter is equal to $$\frac{1}{G} \cdot \frac{(1+\alpha) + (\alpha - 1)z^{-1}}{1 - z^{-1}},$$

where G is a gain correction factor, α is the transmission parameter.

Further examples provide a system having means for performing the method according to any one of the preceding examples B.

Example B16 provides a system for communicating video signals in a vehicle over a wired analog transmission link, the system including a transmitter and a receiver. The transmitter is placed at a first location within the vehicle and is configured to transmit a video signal over the wired analog transmission link, where the transmitted video signal is indicative of a video signal acquired by an image sensor communicatively coupled to the transmitter. The receiver is placed at a second location within the vehicle, where the second location is different from the first location, and is configured to receive the video signal transmitted by the transmitter, apply an adaptive filter to the received video signal, and assist rendering of the received video signal, following application of the adaptive filter, on a display.

Example B17 provides the system according to example B16, where a transfer function of the adaptive filter is dependent on a transmission parameter and wherein the transmission parameter is based on a plurality of parameters of the AC-coupled channel.

Example B18 provides the system according to example B17, where the transmission parameter is adapted over two or more iterations of the adaptive filter.

Example B19 provides the system according to example B16, where the adaptive filter characterized by a transfer function that inverts one or more transmission characteristics of the wired analog transmission link.

Example B20 provides a system for communicating video signals in a vehicle over an AC-coupled transmission link, the system including a transmitter and a receiver. The transmitter is placed at a first location within the vehicle and is configured to transmit a video signal over the AC-coupled transmission link. The transmitted video signal includes a video signal acquired by an image sensor, the image sensor communicatively coupled to the transmitter, a plurality of horizontal synchronization and vertical synchronization signals, and one or more instances of predefined content. The receiver is placed at a second location within the vehicle, where the second location is different from the first location, and is configured to receive the video signal transmitted by the transmitter, adjust a transmission parameter of an adaptive filter based on the predefined content extracted from the received video signal, and apply an adaptive filter to the received video signal, the adaptive filter having a transfer function based on the transmission parameter. The receiver may further be configured to assist rendering of the received video signal, following application of the adaptive filter, on a display.

Any one of the system, the transmitter, the receiver, and the method of any one of the preceding examples may be implemented in a vehicle or in a surveillance system. Furthermore, any one of the system, the transmitter, the receiver, and the method of any one of the preceding examples may include, or be communicatively coupled/ connected to an image sensor or camera configured to acquire the video signal (or, in general, a video/audio/image signal, which may include video and/or audio and/or image signals) to be transmitted over the AC-coupled link as described herein, where the camera may include a plurality of optical sensors (e.g. photodiodes) configured to generate pixel values of the video/audio/image signal to be transmitted over such an AC-coupled link.

Variations and Implementations

Principles and advantages discussed herein can be used in any device or system that may need an AC-coupled link for communicating video signals, audio signals, and/or images. It is to be understood that not necessarily all objects or advantages mentioned herein may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), FPGAs, and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be distributed or consolidated in any suitable manner. Along similar design alternatives, any of the illustrated components, modules, and elements of the FIGS. may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to various aspects of SAG effect compensation using adaptive filtering and/or known content inserted into video signals, e.g. those summarized in the one or more processes shown in FIGS. 5 and 6, illustrate only some of the possible functions that may be executed by, or within, the systems illustrated in the FIGS, e.g. the systems shown in FIGS. 8 and 9. Some of these operations may be deleted or removed where appropriate, or these operations may be modified or changed considerably without departing from the scope of the present disclosure. In addition, the timing of these operations may be altered considerably. The preceding operational flows, e.g. as shown in FIGS. 5 and 6, have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the apparatus, device, or system described above may also be implemented with respect to the method or processes of using or operating said apparatus device, or system, and specifics in the examples provided for any of the apparatus, device, or system described herein may be used anywhere in corresponding methods or processes, and vice versa.

The invention claimed is:

1. A system for processing video signals received over an alternating current (AC)-coupled channel, the system comprising:
a receiver logic, configured to:
apply a filter to a received video signal to generate a corrected video signal, where a transfer function of the filter is dependent on a transmission parameter that is based on a plurality of parameters of the AC-coupled channel, where the plurality of parameters includes a capacitance of the AC-coupled channel and a resistance of the AC-coupled channel;
extract predefined content from the corrected video signal;
adjust the transmission parameter based on a comparison of the extracted predefined content with expected predefined content; and
use the adjusted transmission parameter for subsequent applications of the filter.

2. The system according to claim 1, wherein applying the filter, extracting the predefined content, and adjusting the transmission parameter are performed iteratively.

3. The system according to claim 1, wherein the transmission parameter is adjusted as to reduce a difference between the extracted predefined content and the expected predefined content.

4. The system according to claim 1, wherein the plurality of parameters further includes a clock frequency of the filter.

5. The system according to claim 1, wherein the receiver logic is further configured to:
generate timing information from the received video signal; and
use the timing information in extracting the predefined content.

6. The system according to claim 5, wherein the receiver logic is configured to generate timing information by:
applying a low-pass filter to the received video signal to generate a low-pass filtered video signal,
applying a SAG reduction filter to the low-pass filtered video signal to generate a SAG reduced low-pass filtered video signal,
applying coarse clamping to the SAG reduced low-pass filtered video signal to generate a clamped video signal, and
generating the timing information based on the clamped video signal.

7. The system according to claim 6, wherein generating the timing information based on the clamped video signal includes:
performing synchronization slicing on the clamped video signal to generate a sliced signal, and
generating the timing information based on a sampling window of the sliced signal.

8. The system according to claim 1, wherein adjusting the transmission parameter based on the comparison of the extracted predefined content with expected predefined content includes increasing or decreasing the transmission parameter based on a difference between an amplitude of at least one component of the extracted predefined content and an amplitude of at least one component of the expected predefined content.

9. The system according to claim 1, wherein the filter is a z-domain filter, and the transfer function of the filter is equal to $$\frac{1}{G} \cdot \frac{(1+\alpha) + (\alpha - 1)z^{-1}}{1 - z^{-1}},$$

wherein G is a gain correction factor, α is the transmission parameter.

10. The system according to claim 1, wherein the filter is included in a receiver of the system, and the AC-coupled channel is configured to be coupled the receiver.

11. The system according to claim 1, wherein the transfer function of the filter is proportional to the transmission parameter and is inversely proportional to a gain correction factor of the filter.

12. The system according to claim 1, wherein the system further includes a video rendering device, configured to display information indicative of the corrected video signal.

13. A system for processing video signals received over an alternating current (AC)-coupled channel, the system comprising:
a receiver logic, configured to:
apply a first filter to the received video signal to generate a corrected video signal, wherein a transfer function of the first filter is dependent on a transmission parameter and wherein the transmission parameter is based on a plurality of parameters of the AC-coupled channel;
apply a second filter to a signal based on the received video signal, where the second filter is a low-pass filter, to generate a low-pass filtered video signal;
apply clamping to a signal based on the low-pass filtered video signal to generate a clamped video signal;
generate timing information based on the clamped video signal;
use the timing information to extract predefined content from the corrected video signal;
adjust the transmission parameter based on a comparison of the extracted predefined content with expected predefined content; and
use the adjusted transmission parameter for subsequent applications of the first filter.

14. The system according to claim 13, wherein the signal based on the received video signal is the corrected video signal.

15. The system according to claim 13, wherein the signal based on the received video signal is the received video signal to which the first filter has not been applied.

16. The system according to claim 13, wherein the predefined content includes one or more of:
one or more pulses of one or more predefined amplitudes, and
one or more test lines inserted into the video signal prior to transmitting the video signal over the AC-coupled transmission channel.

17. The system according to claim 13, wherein the system further includes a video rendering device, configured to display information indicative of the corrected video signal.

18. A system for processing video signals received over an alternating current (AC)-coupled channel, the system comprising:
a receiver logic, configured to:
apply a filter to the received video signal to generate a corrected video signal, where a transfer function of the filter is dependent on a gain correction factor and a transmission parameter, where the gain correction factor is based on a ratio between a receiver-side resistance and a total resistance of the AC-coupled channel, and where the transmission parameter is based on a plurality of parameters of the AC-coupled channel;
extract predefined content from the corrected video signal;
adjust the transmission parameter based on a comparison of the extracted predefined content with expected predefined content; and
use the adjusted transmission parameter for subsequent applications of the filter.

19. The system according to claim 18, wherein the predefined content includes one or more of:
one or more pulses of one or more predefined amplitudes, and
one or more test lines inserted into the video signal prior to transmitting the video signal over the AC-coupled transmission channel.

20. The system according to claim 18, wherein the system further includes a video rendering device, configured to display information indicative of the corrected video signal.

* * * * *